United States Patent
Lee

(10) Patent No.: US 9,274,315 B2
(45) Date of Patent: Mar. 1, 2016

(54) PHOTOGRAPHING LENS AND ELECTRONIC APPARATUS INCLUDING THE SAME

(71) Applicant: SAMSUNG ELECTRONICS CO., LTD., Suwon-si, Gyeonggi-do (KR)

(72) Inventor: Tae-youn Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/293,181

(22) Filed: Jun. 2, 2014

(65) Prior Publication Data

US 2015/0015765 A1    Jan. 15, 2015

(30) Foreign Application Priority Data

Jul. 10, 2013    (KR) ................. 10-2013-0081202

(51) Int. Cl.
| | |
|---|---|
| G02B 13/18 | (2006.01) |
| G02B 9/62 | (2006.01) |
| G02B 13/00 | (2006.01) |
| G02B 27/64 | (2006.01) |

(52) U.S. Cl.
CPC ............. G02B 13/0045 (2013.01); G02B 9/62 (2013.01); G02B 27/646 (2013.01)

(58) Field of Classification Search
CPC ............................. G02B 9/62; G02B 13/0045
USPC .......................................... 359/713, 757, 759
See application file for complete search history.

(56) References Cited

U.S. PATENT DOCUMENTS

| | | | |
|---|---|---|---|
| 5,311,364 | A | 5/1994 | Kanoshima et al. |
| 6,449,433 | B2 | 9/2002 | Hagimori et al. |
| 7,502,181 | B2 | 3/2009 | Shinohara |
| 8,035,723 | B2 | 10/2011 | Sano et al. |
| 2012/0188654 | A1 | 7/2012 | Huang |
| 2012/0243108 | A1 | 9/2012 | Tsai et al. |

(Continued)

FOREIGN PATENT DOCUMENTS

| | | |
|---|---|---|
| JP | 2001-350093 A | 12/2001 |
| JP | 2009-294527 A | 12/2009 |
| JP | 2009-294528 A | 12/2009 |

(Continued)

OTHER PUBLICATIONS

PCT Search Report and Written Opinion issued for PCT/KR2014/005921 (Oct. 13, 2014).

(Continued)

*Primary Examiner* — William Choi
(74) *Attorney, Agent, or Firm* — Drinker Biddle & Reath LLP

(57) ABSTRACT

Provided are a photographing lens and an electronic apparatus including the same. The photographing lens includes: a first lens that includes a convex object-side surface and has a positive refractive power; a second lens that includes a convex image-side surface and has a positive or negative refractive power; a third lens that has a negative refractive power; a fourth lens that has a positive or negative refractive power; a fifth lens that includes a convex image-side surface and has a positive refractive power; and a sixth lens that includes an image-side surface that is concave near an optical axis, and has a negative refractive power, wherein the first through sixth lenses are sequentially arranged from an object side.

23 Claims, 22 Drawing Sheets

(56) References Cited

U.S. PATENT DOCUMENTS

| | | |
|---|---|---|
| 2014/0043695 A1 | 2/2014 | Hsu et al. |
| 2015/0062406 A1* | 3/2015 | Chen et al. .................... 348/335 |

FOREIGN PATENT DOCUMENTS

| | | |
|---|---|---|
| JP | 2012-155223 A | 8/2012 |
| KR | 10-2007-0097369 A | 10/2007 |
| KR | 10-2010-0001525 A | 1/2010 |
| KR | 10-2010-0040357 A | 4/2010 |
| KR | 10-2010-0043667 A | 4/2010 |
| KR | 10-2011-0024872 A | 3/2011 |
| TW | 201250283 A | 12/2012 |
| WO | WO 2012/169778 A2 | 12/2012 |

OTHER PUBLICATIONS

Extended European Search Report issued for EP 14174031.6 (Nov. 6, 2014).

* cited by examiner

PHOTOGRAPHING LENS AND ELECTRONIC APPARATUS INCLUDING THE SAME

RELATED APPLICATIONS

This application claims the priority benefit of Korean Patent Application No. 10-2013-0081202, filed on Jul. 10, 2013, in the Korean Intellectual Property Office, the disclosure of which is incorporated herein in its entirety by reference.

BACKGROUND

1. Field

One or more embodiments relate to a small and bright photographing lens and an electronic apparatus including the same.

2. Description of the Related Art

Many photographing apparatuses use solid-state imaging devices such as charge-coupled device (CCD) image sensors or complementary metal-oxide semiconductor (CMOS) image sensors. Examples of photographing apparatuses include digital still cameras, video cameras, and interchangeable lens cameras. Also, with the trend toward miniaturization, photographing apparatuses using solid-state imaging devices are applied to small information terminals including mobile phones. Users need high performance such as high resolution and a wide angle. Also, the professionalism of users of cameras has gradually increased. Also, there is an increasing demand for bright photographing lenses capable of achieving an out-focusing effect or the like.

For example, lenses for mobile phone cameras are generally used with sensors having sizes of ⅕" to ⅓" according to miniaturization and due to the lowered cost of image sensors, and general image sensors used with main lenses used in the market have sizes of ¼" or ⅓" (herein 1"=1 inch).

When small image sensors are used in optical systems using solid-state imaging devices, since a focal length is short, a depth of field is great, which is appropriate when taking pictures of scenery but is inappropriate when taking pictures of people.

Accordingly, in order to more effectively take pictures of people by using, for example, an out-focusing effect that blurs a background, a large image sensor and a bright lens having a low f-number are necessary.

SUMMARY

One or more embodiments include a small and bright photographing lens.

One or more embodiments include an electronic apparatus including a small and bright photographing lens.

Additional aspects will be set forth in part in the description which follows and, in part, will be apparent from the description, or may be learned by practice of the presented embodiments.

According to one or more embodiments, a photographing lens includes: a first lens that comprises a convex object-side surface and has a positive refractive power; a second lens that includes a convex image-side surface and has a positive or negative refractive power; a third lens that has a negative refractive power; a fourth lens that has a positive or negative refractive power; a fifth lens that includes a convex image-side surface and has a positive refractive power; and a sixth lens that includes an image-side surface that is concave near an optical axis, and has a negative refractive power, wherein the first through sixth lenses are sequentially arranged from an object side.

The photographic lens may satisfy $20<V1-V3<45$ where $V1$ is an Abbe number of the first lens, and $V3$ is an Abbe number of the third lens.

The photographing lens may satisfy $0.2<|R11+R22|/|R11-R22|<2.5$ where $R11$ is a radius of curvature of the object-side surface of the first lens, and $R22$ is a radius of curvature of the image-side surface of the second lens.

The photographing lens may satisfy $0.7<f/f12<1.9$ where $f$ is a total focal length of the photographing lens, and $f12$ is a combined focal length of the first lens and the second lens.

The photographing lens may satisfy $0.9<TL/f<2.0$ where $TL$ is a distance on the optical axis between a vertex of the object-side surface of the first lens and an image plane, and $f$ is a total focal length of the photographing lens.

The third lens may be a double-concave lens, or a meniscus lens whose image-side surface is concave.

The photographing lens may satisfy $0.3<|f/f3|<1.5$ where $f$ is a total focal length of the photographing lens, and $f3$ is a focal length of the third lens.

An object-side surface of the fourth lens may be concave or convex.

The image-side surface of the fifth lens may have a convex meniscus shape.

The photographing lens may satisfy $1.0<f/f5<3.0$ where $f$ is a total focal length of the photographing lens, and $f5$ is a focal length of the fifth lens.

The sixth lens may be an aspheric lens that includes the image-side surface that is concave near the optical axis, and has at least one inflection point.

The photographing lens may satisfy $1.58<N3<1.68$ where $N3$ is a refractive index of the third lens at a d-line.

The photographing lens may satisfy $1.51<N5<1.56$ and $1.51<N6<1.56$ where $N5$ is a refractive index of the fifth lens at a d-line, and $N6$ is a refractive index of the sixth lens at the d-line.

The photographing lens may satisfy $Yimg/Tan\ \theta>6.0$ mm where $Yimg$ is a maximum image height on an image plane, and $Tan\ \theta$ is a half angle of view at the maximum image height.

A stop may be provided between the first lens and the second lens, or may be provided on the object side of the first lens.

Each of the third through sixth lenses may be formed of a plastic material.

Camera shake may be corrected by moving all of the first through sixth lenses.

The photographing lens may have an f-number ranging from 1.7 to 2.8.

Both surfaces of the third lens may be aspheric surfaces.

At least one surface of the fourth lens may be an aspheric surface.

The fifth lens may be an aspheric lens.

According to another embodiment, an electronic apparatus includes: a photographing lens; and an image sensor that receives an optical image formed by the photographing lens and converts the optical image into an electrical image signal, wherein the photographing lens includes: a first lens that includes a convex object-side surface and has a positive refractive power; a second lens that includes a convex image-side surface and has a positive or negative refractive power; a third lens that has a negative refractive power; a fourth lens that has a positive or negative refractive power; a fifth lens that includes a convex image-side surface and has a positive refractive power; and a sixth lens that includes an image-side surface that is concave near an optical axis, and has a negative refractive power, wherein the first through sixth lenses are sequentially arranged from an object side.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
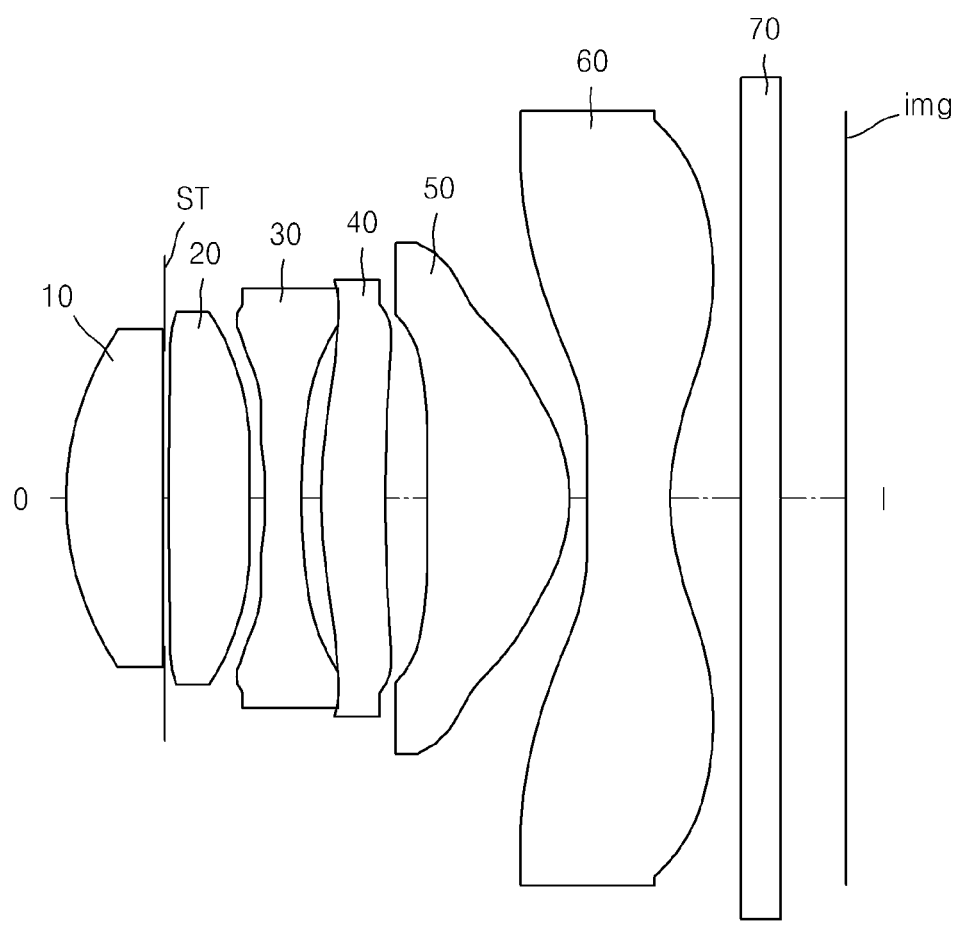
FIG. 1 is a view illustrating a photographing lens according to an embodiment.

The exemplary embodiments will now be described more fully with reference to the accompanying drawings, in which the exemplary embodiments are shown. As used herein, the term "and/or" includes any and all combinations of one or more of the associated listed items. Expressions such as "at least one of," when preceding a list of elements, modify the entire list of elements and do not modify the individual elements of the list.

FIGS. 1, 4, 7, 10, 13, 16, and 19 are views illustrating photographing lenses according to embodiments.

A photographing lens includes a first lens 10 having a positive refractive power, a second lens 20 having a positive or negative refractive power, a third lens 30 having a negative refractive power, a fourth lens 40 having a positive or negative refractive power, a fifth lens 50 having a positive refractive power, and a sixth lens 60 having a negative refractive power, which are sequentially arranged from an object side O to an image side I. A stop ST may be disposed between the first lens 10 and the second lens 20. Alternatively, the stop ST may be disposed on the object side O of the first lens 10.

The photographing lens may reduce sensitivity according to decentering because the first lens 10 and the second lens 20 are substantially symmetric with each other. An object-side surface of the first lens 10 and an image-side surface of the second lens 20 may be symmetric with each other. For example, the object-side surface of the first lens 10 may be convex, and the image-side surface of the second lens 20 may be convex. As the first lens 10 and the second lens 20 are symmetric with each other, spherical aberration that is increased due to a large aperture may be reduced.

Each of the first lens 10 and the second lens 20 may be formed of an aspheric glass mold material. However, each of the first lens 10 and the second lens 20 may be formed of plastic. The stop ST may be disposed on the object side O of the first lens 10 in order to reduce an optical total length (see Embodiment 7)

The third lens 30 may have an image-side surface that is concave near an optical axis. Although being concave near the optical axis, the image-side surface of the third lens 30 may be almost flat or convex away from the optical axis. The third lens 30 may be, for example, a biconcave lens or a meniscus lens whose image-side surface is concave. The third lens 30 that is formed of a high-dispersive material may appropriately correct longitudinal chromatic aberration and chromatic aberration of magnification that increase in proportion to a focal length that increases when a large image sensor is used. Accordingly, axial chromatic aberration (longitudinal chromatic aberration) may be effectively suppressed. Both surfaces of the third lens 30 may be aspheric surfaces.

The fourth lens 40 that is formed of a high-dispersive material may correct residual longitudinal chromatic aberration and chromatic aberration of magnification and may effectively correct off-axial coma aberration. At least one surface of the fourth lens 40 may be an aspheric surface. An object-side surface of the fourth lens 40 may be concave or convex.

Since the fifth lens 50 is formed such that an image-side surface is convex, the fifth lens 50 may correct aberration and have telecentric properties. The fifth lens 50 may be an aspheric lens.

Since the sixth lens 60 has a negative refractive power, the sixth lens 60 may easily secure a back focal length. An image-side surface of the sixth lens 60 may be concave near the optical axis, and the sixth lens 60 may have at least one inflection point. The term 'inflection point' refers to a point at which a sign of a radius of curvature changes from (+) to (−) or from (−) to (+). Since the image-side surface of the sixth lens 60 is concave near the optical axis and convex toward an image side away from the optical axis, the sixth lens 60 may correct residual field curvature and distortion of the first lens 10 to the fifth lens 50 at every viewing angle and may adjust an angle at which a chief ray is incident on an image plane img, thereby preventing color shading. The image plane img may be, for example, an image sensor surface.

Each of the first lens 10 and the second lens 20 may be formed of plastic or glass. Each of the third through sixth lenses 30 through 60 may be formed of a plastic material.

The photographing lens may satisfy $$20 < V1 - V3 < 45 \quad (1),$$

where V1 is an Abbe number of the first lens 10, and V3 is an Abbe number of the third lens 30.

Inequality 1 is an inequality for appropriately correcting overall chromatic aberration of the photographing lens. The term "chromatic aberration" refers to longitudinal chromatic aberration for axial, and lateral chromatic aberration for off-axial. Chromatic aberration (in particular, longitudinal chromatic aberration on axial) that increases in proportion to a focal length that increases when a large image sensor is used may be reduced when the photographing lens satisfies Inequality 1. In a range of Inequality 1, chromatic aberration may be more easily corrected as (V1−V3) gets closer to a lower limit, and a lens may be formed of a material that is inexpensive and easy to obtain as (V1−V3) gets closer to an upper limit.

The photographing lens may satisfy $$0.2 < |R11 + R22|/|R11 - R22| < 2.5 \quad (2)$$

where R11 is a radius of curvature of the object-side surface of the first lens 10, and R22 is a radius of curvature of the image-side surface of the second lens 20.

Inequality 2 defines shapes of the object-side surface of the first lens 10 and the image-side surface of the second lens 20. When (|R11+R22|/|R11−R22|) has a value equal to or less than a lower limit of Inequality 2, a refractive power of the image-side surface of the second lens 20 is increased, and thus it is difficult to obtain a refractive power balance between the first lens 10 and the second lens 20. Also, it is difficult to correct spherical aberration off-axial coma aberration due to a large aperture. When (|R11+R22|/|R11−R22|) exceeds an upper limit of Inequality 2, since a refractive power of the image-side surface of the second lens 20 is reduced, a high-dispersive material is necessary in order to maintain the refractive power balance between the first lens 10 and the second lens 20. However, since a high-dispersive material is expensive and has a narrow range of choice, it is difficult to process the photographing lens.

The photographing lens may satisfy $$0.7 < f/f12 < 1.9 \quad (3)$$

where f is a total focal length of the photographing lens, and f12 is a combined focal length of the first lens 10 and the second lens 20.

Inequality 3 may define refractive powers of the first lens 10 and the second lens 20, and a combined refractive power of the first lens 10 and the second lens 20 may be a positive refractive power. When (f/f12) has a value equal to or less than a lower limit of Inequality 3, refractive powers of the first lens 10 and the second lens 20 are reduced, and thus longitudinal chromatic aberration of the photographing lens is increased. When (f/f12) has a value equal to or greater than an upper limit, since refractive powers are excessively increased and thus spherical aberration is increased, it is difficult to correct aberration.

The photographing lens satisfies $$0.9 < TL/f < 2.0 \quad (4)$$

where TL is a distance on the optical axis between a vertex of the object-side surface of the first lens and the image plane img, and f is a total focal length of the photographing lens. The axial distance TL includes an air-converted distance with respect to a filter or a cover glass disposed between the image sensor and the sixth lens 60. For example, when a cover glass having a thickness d is disposed between the sixth lens 60 and the image sensor, an air-converted distance Δd with respect to the cover glass is defined by $$\Delta d = (1 - 1/n) \times d \quad (5)$$

where n is a refractive index of the cover glass, and d is a thickness of the cover glass.

The photographing lens may be miniaturized when satisfying Inequality 4. When (TL/f) is equal to or greater than an upper limit of Inequality 4, axial aberration and off-axial aberration may be effectively corrected. However, since an optical total length is increased, it is difficult to miniaturize the photographing lens. When (TL/f) is equal to or less than a lower limit of Inequality 4, since a thickness of the photographing lens is reduced, it is difficult to form an injection-molded lens and sensitivity is increased, thereby reducing productivity.

The photographing lens may satisfy $$0.3 < |f/f3| < 1.5 \quad (6)$$

where f is a total focal length of the photographing lens, and f3 is a focal length of the third lens 30.

When |f/f3| exceeds a range of Inequality 6, since a negative refractive power is excessively reduced or increased, it may be difficult to correct aberration. The Petzval sum and field curvature may be appropriately corrected when |f/f3| satisfies Inequality 6.

The photographing lens may satisfy $$1.0 < f/f5 < 3.0 \quad (7)$$

where f is a total focal length of the photographing lens, and f5 is a focal length of the fifth lens 50.

When (f/f5) has a value equal to or less than a lower limit of Inequality 7, since a refractive power of the fifth lens 50 is excessively reduced, it is difficult to correct field curvature and distortion. When (f/f5) has a value equal to or greater than an upper limit, since a refractive power of the fifth lens 50 is excessively increased, an angle at which light is emitted on the image-side surface of the fifth lens 50 may be reduced and an angle at which light is incident on the image sensor may be excessively increased. Accordingly, the amount of light going over an effective image-focusing surface of the image sensor is increased. Also, spherical aberration and field curvature may be excessively generated.

The image-side surface of the sixth lens 60 may be concave near the optical axis. The sixth lens 60 may have a sea gull-like shape in which the image-side surface is convex away from the center of the optical axis. Hence, field curvature generated from the first lens 10 to the fifth lens 50 may be corrected, an image may be formed, and the image plane img may be uniformly flattened. Also, an angle at which light is incident on the image sensor (that is, a chief ray angle (CRA) at which a chief ray is incident on the image plane img) may be controlled. Color shading may be prevented by matching a CRA between the image sensor and the photographing lens.

The third lens 30 may satisfy $$1.58 < N3 < 1.68 \quad (8)$$

where N3 is a refractive index of the third lens 30 at a d-line.

The fifth lens 50 and the sixth lens 60 may satisfy $$1.51 < N5 < 1.56$$

$$1.51 < N6 < 1.56 \quad (9)$$

where N5 is a refractive index of the fifth lens 50 at the d-line, and N6 is a refractive index of the sixth lens 60 at the d-line.

When Inequalities 8 and 9 are satisfied, costs of manufacturing the photographing lens may be reduced, and the photographing lens may be made lightweight and may be easily processed.

The photographing lens may satisfy $$Y_{img}/\tan \theta > 6.0 \text{ mm} \quad (10)$$

where Yimg is a maximum image height on the image plane img, and Tan θ is a half angle of view at the maximum image height.

Inequality 10 shows a ratio between the maximum image height and the half angle of view, and a large image sensor may be employed when Inequality 10 is satisfied. The maximum image height may be a half of a diagonal length of the image sensor. The large image sensor may have a size of, for example, 1/1.7". When the large image sensor is employed, high image quality may be achieved, and a picture may be taken by using an effect such as out-focusing (that blurs a background) which is difficult for a small image sensor to provide.

The photographing lens may correct camera shake by moving all of the first through sixth lenses 10 through 60. An image height including the amount of stroke according to an angle at which camera shake is corrected may be obtained when Inequality 10 is satisfied.

Also, auto-focusing may be performed by dispatching all of the first through sixth lenses 10 through 60. Focusing may be performed from a far distance to a Macro range by moving all of the lenses by using an AF motor such as a piezo motor or a voice coil motor (VCM).

The photographing lens may have an f-number ranging from 1.7 to 2.8. Hence, the photographing lens may be bright with a high sensitivity of the large image sensor. Also, the photographing lens may provide an effect such as out-focusing (that blurs a background) by having a shallow depth of field.

An aspheric surface used in the photographing lens according to an embodiment is defined as follows.

An aspheric shape may be expressed as the following equation when an optical axis is an x-axis and, a direction perpendicular to the optical axis is a y-axis, and a direction in which light travels is a positive direction. Here, x is a distance from a vertex of the photographing lens to the optical axis, y is a distance perpendicular to the optical axis, K is a conic constant, a, b, c, and d are aspheric coefficients, and C is a reciprocal (1/R) of a radius of curvature at the vertex of the photographing lens.

$$x = \frac{Cy^2}{1+\sqrt{1-(K+1)C^2y^2}} + ay^4 + by^6 + cy^8 + dy^{10}. \quad (11)$$

The photographing lens is realized according to any of the following various embodiments. Hereinafter, a total focal length is expressed in units of mm, a viewing angle is expressed in units of degrees, and * is an aspheric surface. As for wavelengths, a C-line corresponds to 656.3 nm, a d-line corresponds to 587.6 nm, an e-line corresponds to 546.1 nm, a g-line corresponds to 435.8 nm, and an F-line corresponds to 486.1 nm.

In each embodiment, at least one filter 70 may be provided on the image side I. The filter 70 may include at least one of, for example, a low pass filter, an IR-cut filter, and a cover glass. However, the photographing lens may be configured without a filter. In each embodiment, lens surface numbers may be sequentially assigned from the object side O to the image side I.

<Embodiment 1>

FIG. 1 is a view illustrating a photographing lens according to an embodiment, and design data of FIG. 1 is shown in Table 1 below. Hereinafter with respect to Embodiment 1, a maximum image height is Y=4.9 mm.

In FIG. 1, refractive powers of the first through sixth lenses 10 through 60 are, respectively, positive, positive, negative, positive, positive, and negative, and the stop ST is disposed between the first lens 10 and the second lens 20.

An f-number is f/1.88, a half angle of view is 33.73° (1°=1 degree of arc), an optical total length is 9.60 mm, and a total focal length f is 7.28 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 1

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2* | 3.579 | 1.182 | 1.531 | 55.75 |
| 3* | −257.005 | 0.040 | | |
| 4(ST) | infinity | 0.007 | | |
| 5 | infinity | 0.033 | | |
| 6* | 512.123 | 1.000 | 1.531 | 55.75 |
| 7* | −18.705 | 0.186 | | |
| 8* | −18.937 | 0.450 | 1.633 | 23.36 |
| 9* | 7.032 | 0.264 | | |
| 10* | 8.879 | 0.778 | 1.633 | 23.36 |
| 11* | 11.078 | 0.542 | | |
| 12* | −24.499 | 1.758 | 1.531 | 55.75 |
| 13* | −1.664 | 0.202 | | |
| 14 | infinity | 0.000 | | |
| 15* | −15.381 | 1.000 | 1.531 | 55.75 |
| 16* | 1.749 | 0.558 | | |
| 17 | infinity | 0.500 | 1.517 | 64.20 |
| 18 | infinity | 1.09 | | |
| img | infinity | 0.010 | | |

In Table 1, * is an aspheric surface, img is an image plane (or an image sensor), and a conic constant K and aspheric coefficients A, B, C, D, and E are shown in Table 2 below.

TABLE 2

| Lens surface | K | A | B | C | D | E |
|---|---|---|---|---|---|---|
| 2 | 0.0000 | −6.1278E−04 | −1.5982E−04 | −7.7128E−05 | 2.2450E−05 | −4.8753E−06 |
| 3 | 0.0000 | 6.3430E−03 | −3.7644E−03 | 7.4794E−04 | −2.6608E−05 | |

TABLE 2-continued

| Lens surface | K | A | B | C | D | E |
|---|---|---|---|---|---|---|
| 6 | 0.0000 | 6.3430E−03 | −3.7644E−03 | 7.4794E−04 | −2.6608E−05 | |
| 7 | 0.0000 | −7.7204E−03 | −3.2185E−03 | 4.8381E−04 | −1.2022E−05 | |
| 8 | 0.0000 | −6.7565E−03 | −3.6546E−03 | 3.9967E−04 | 2.3469E−05 | 6.3768E−06 |
| 9 | 0.0000 | 6.3430E−03 | −2.0212E−03 | 7.6024E−04 | −2.0097E−04 | 2.5248E−05 |
| 10 | 0.0000 | −2.0939E−03 | −7.4096E−06 | −1.1555E−05 | −7.0384E−05 | 1.2354E−07 |
| 11 | 0.0000 | −4.4975E−03 | −3.1120E−04 | −5.6572E−05 | −7.3479E−06 | |
| 12 | 0.0000 | 5.5360E−04 | −3.5033E−03 | 6.4474E−04 | −8.0283E−05 | |
| 13 | −4.8889 | −2.9802E−02 | 8.6816E−03 | −1.9996E−03 | 2.5765E−04 | −1.2165E−05 |
| 15 | 0.0000 | −2.0052E−02 | 2.4790E−03 | −4.6585E−05 | −6.3522E−06 | 2.6544E−07 |
| 16 | −6.8214 | −1.1479E−02 | 1.3131E−03 | −9.6030E−05 | 3.4654E−06 | −4.9424E−08 |

Figure 2:
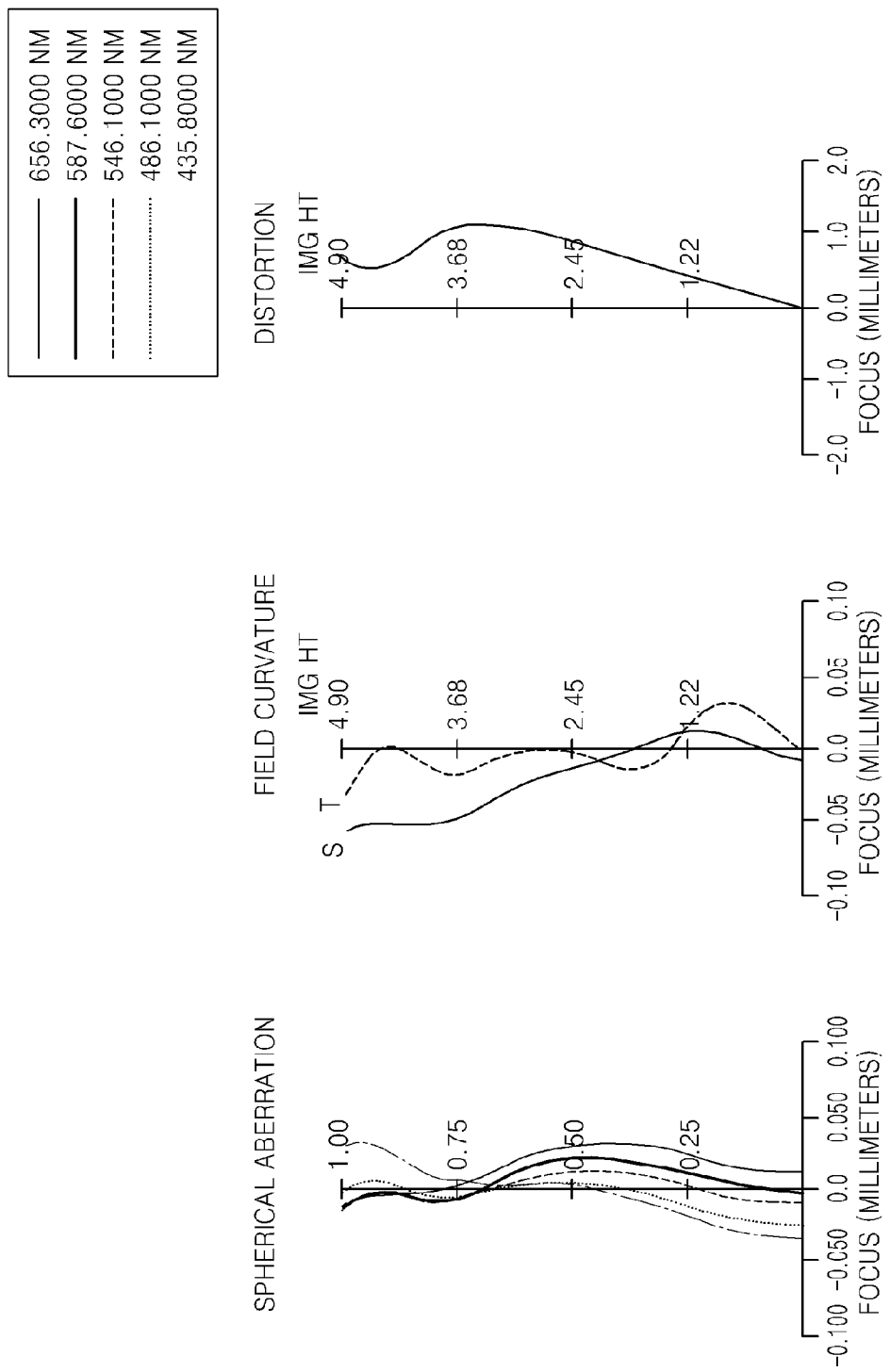
FIG. 2 is a view illustrating longitudinal spherical aberration, field curvature, and distortion of the photographing lens of FIG. 1.
Figure 3:
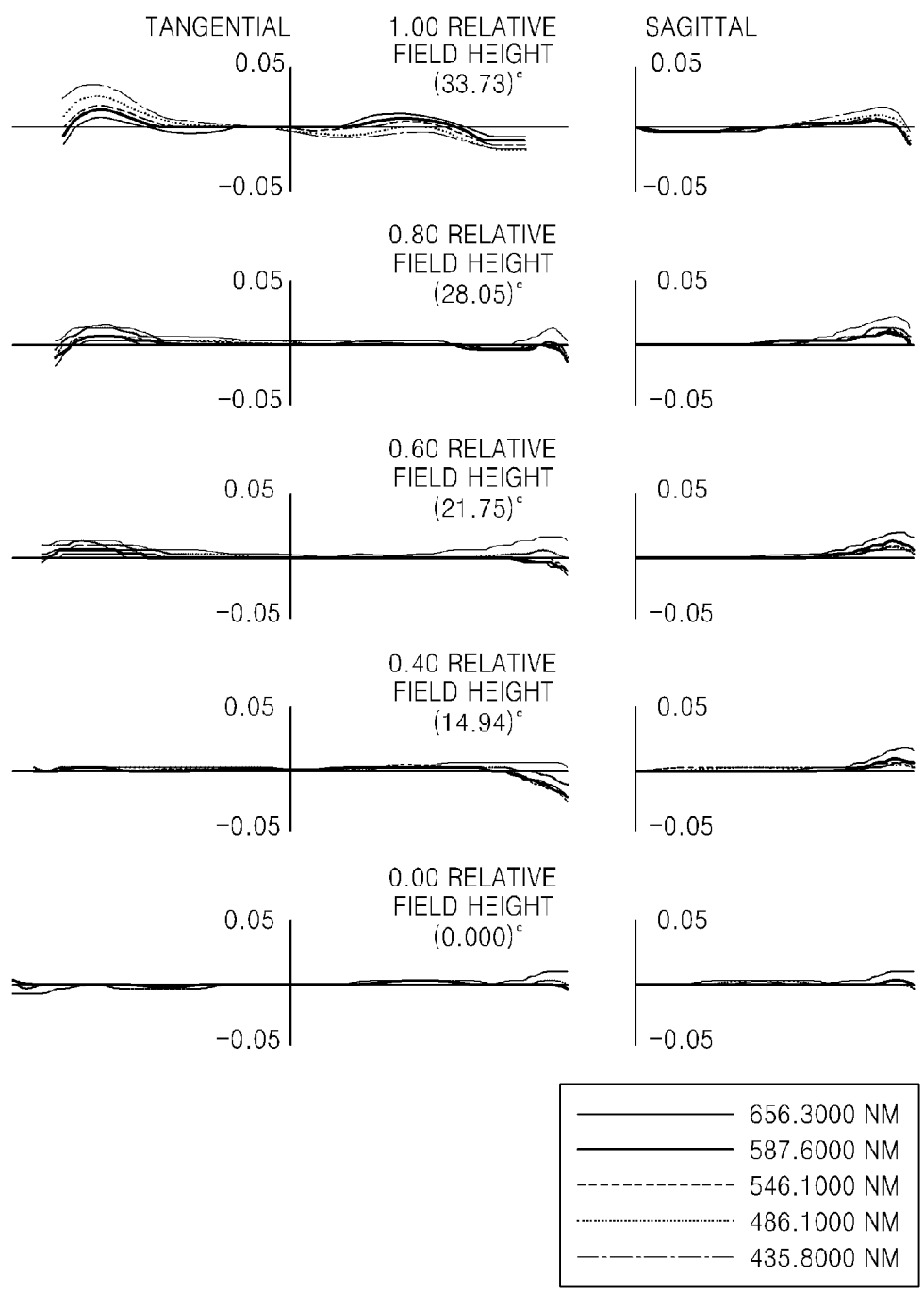
FIG. 3 is a view illustrating coma aberration of the photographing lens of FIG. 1.

FIG. 2 is a view illustrating longitudinal spherical aberration, field curvature, and distortion of the photographing lens of FIG. 1. Examples of the field curvature include tangential field curvature T and sagittal field curvature S. FIG. 3 is a view illustrating coma aberration of the photographing lens of FIG. 1.

<Embodiment 2>

Figure 4:
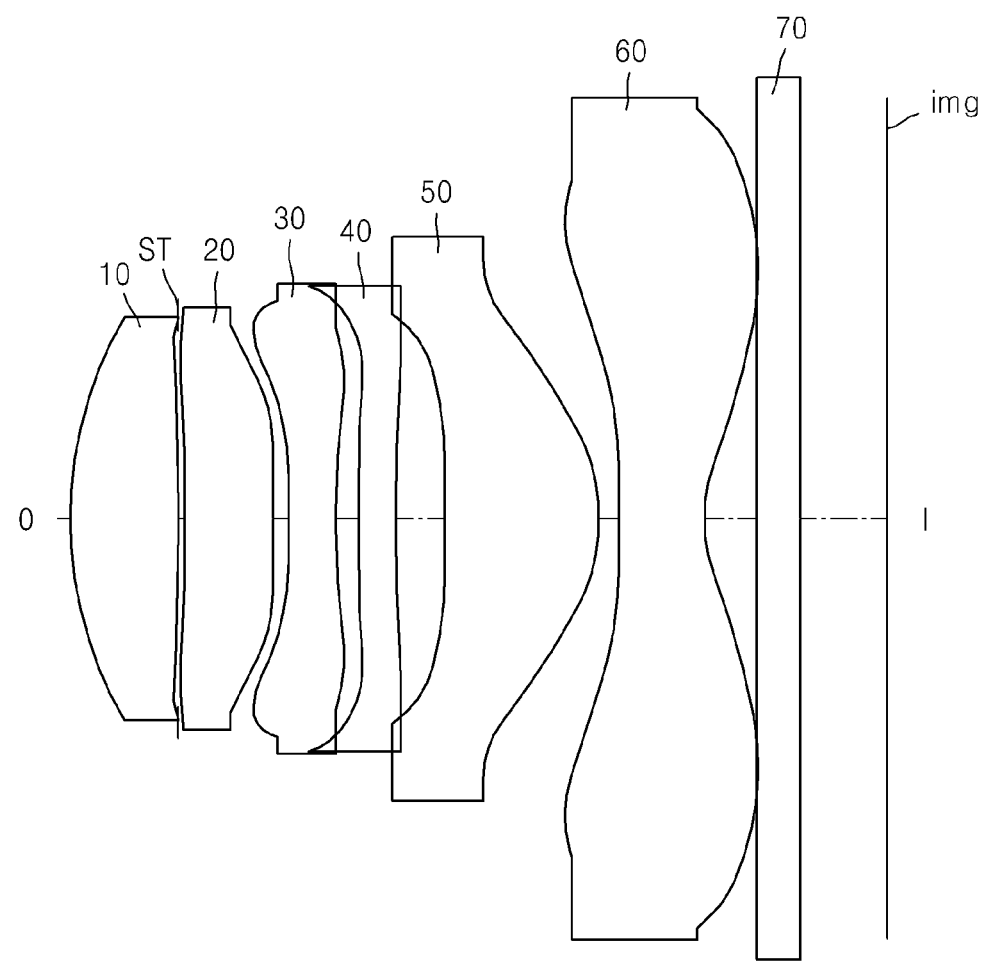
FIG. 4 is a view illustrating a photographing lens according to another embodiment.

FIG. 4 is a view illustrating a photographing lens according to another embodiment, and design data of FIG. 4 is shown in Table 3 below.

In FIG. 4, refractive powers of the first through sixth lenses 10 through 60 are, respectively, positive, negative, negative, positive, positive, and negative, and the stop ST is disposed between the first lens 10 and the second lens 20.

An f-number is f/1.88, a half angle of view is 34.62°, an optical total length is 9.50 mm, and a total focal length f is 7.05 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 3

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2* | 3.924 | 1.250 | 1.544 | 56.11 |
| 3(ST)* | −17.486 | 0.051 | | |
| 4* | −24.693 | 1.000 | 1.544 | 56.11 |
| 5* | −30.602 | 0.179 | | |
| 6* | −30.154 | 0.550 | 1.633 | 23.36 |
| 7* | 8.914 | 0.243 | | |
| 8* | 14.148 | 0.450 | 1.633 | 23.36 |
| 9* | 19.029 | 0.557 | | |
| 10* | −14.842 | 1.773 | 1.531 | 55.75 |
| 11* | −1.709 | 0.240 | | |
| 12 | infinity | 0.000 | | |
| 13* | −32.796 | 1.000 | 1.531 | 55.75 |
| 14* | 1.738 | 0.587 | | |
| 15 | infinity | 0.5 | 1.5168 | 64.2 |
| 16 | infinity | 1.123 | | |
| img | infinity | 0.000 | | |

A conic constant K and aspheric coefficients A, B, C, D, and E are shown in Table 4 below.

TABLE 4

| Lens surface | K | A | B | C | D | E |
|---|---|---|---|---|---|---|
| 2 | 0.0000 | −1.5025E−03 | 1.7397E−05 | −1.5317E−04 | 2.4137E−05 | −3.3705E−06 |
| 3 | 0.0000 | 5.0291E−03 | −3.0996E−03 | 5.1871E−04 | 1.2510E−05 | |
| 4 | 0.0000 | 5.8489E−03 | −3.2885E−03 | 6.1901E−04 | −2.0863E−05 | |
| 5 | 0.0000 | −1.3233E−02 | −4.5757E−03 | 5.2981E−04 | 5.5199E−05 | |
| 6 | 0.0000 | −1.9553E−02 | −4.9596E−03 | 5.4317E−04 | 2.4835E−04 | −2.0332E−05 |
| 7 | 0.0000 | −5.7165E−03 | −2.7449E−03 | 7.4888E−04 | −1.9317E−04 | 2.0657E−05 |
| 8 | 0.0000 | −2.6527E−03 | −5.6983E−04 | −1.3519E−04 | −9.8588E−06 | |
| 9 | 0.0000 | −2.8733E−03 | −4.2185E−04 | 4.1870E−05 | 8.2509E−06 | |
| 10 | 0.0000 | 2.6778E−04 | −3.6475E−03 | 5.3376E−04 | −5.7697E−05 | |
| 11 | −4.7741 | −2.6787E−02 | 7.4944E−03 | −1.6587E−03 | 2.0469E−04 | −8.7673E−06 |
| 13 | 0.0000 | −1.9639E−02 | 2.1915E−03 | −3.2538E−05 | −5.3195E−06 | 2.1054E−07 |
| 14 | −6.4092 | −1.0718E−02 | 1.1186E−03 | −7.8396E−05 | 2.7667E−06 | −3.9145E−08 |

Figure 5:
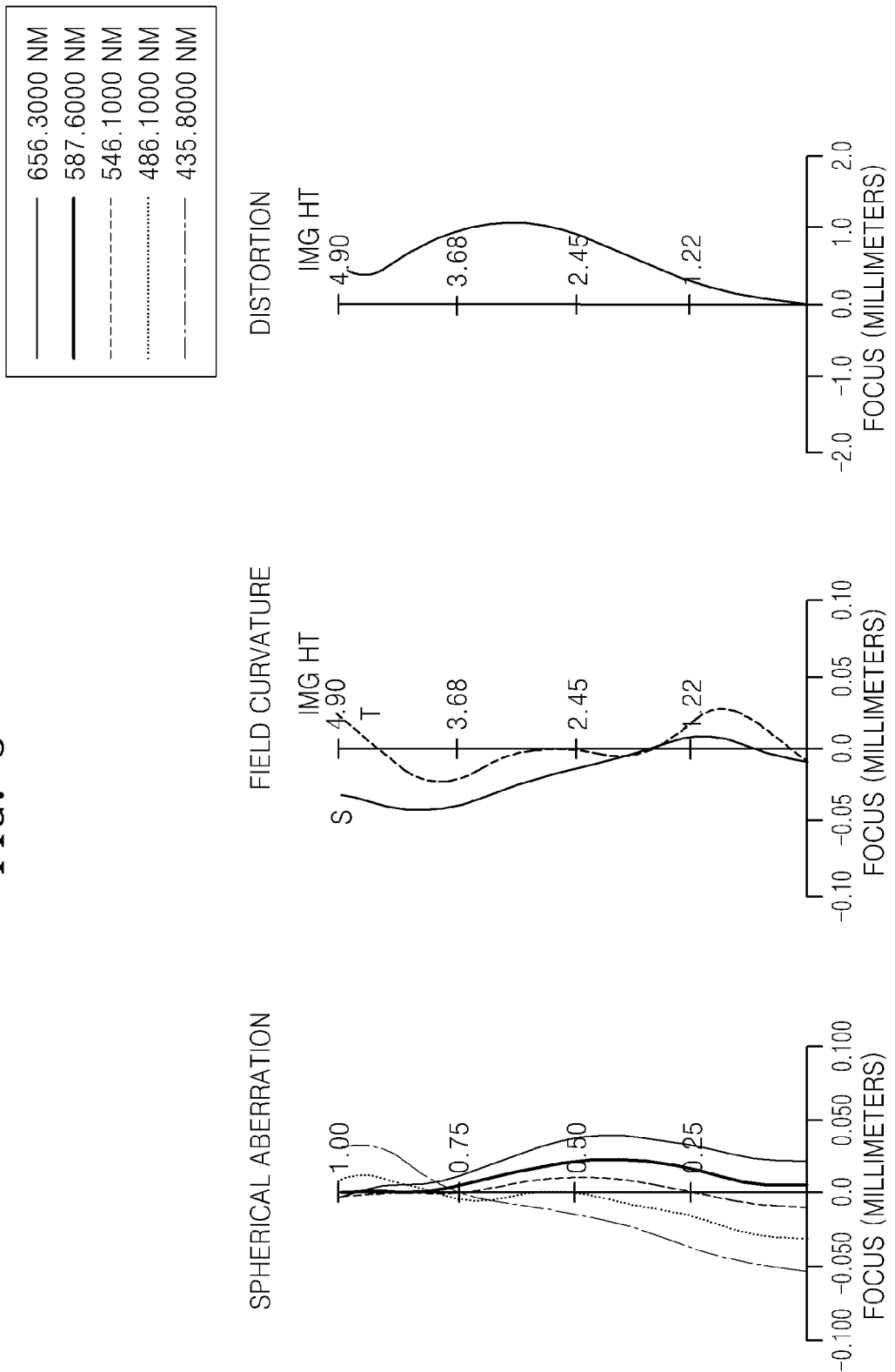
FIG. 5 is a view illustrating longitudinal spherical aberration, field curvature, and distortion of the photographing lens of FIG. 4.
Figure 6:
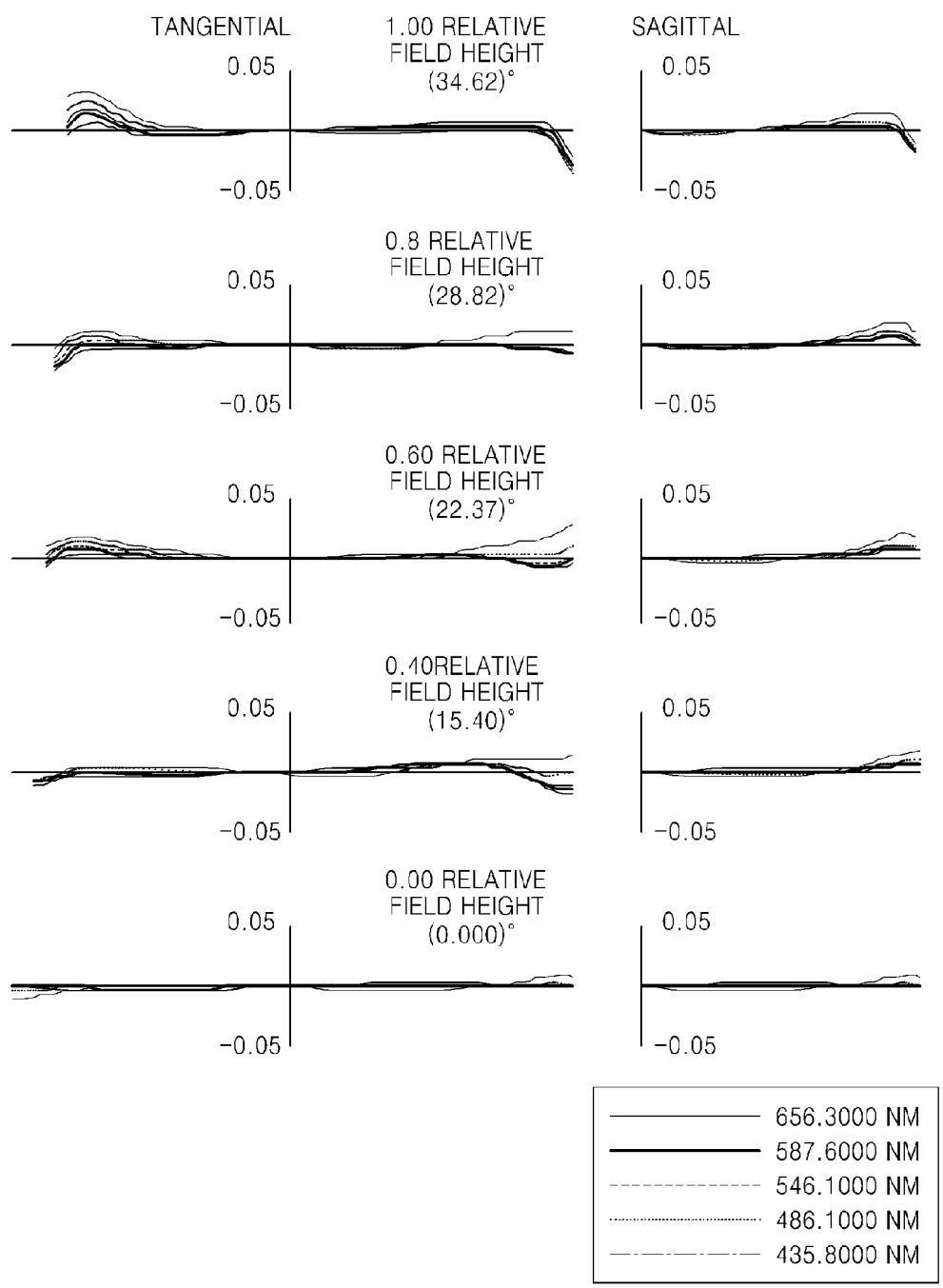
FIG. 6 is a view illustrating coma aberration of the photographing lens of FIG. 4.

FIG. 5 is a view illustrating longitudinal spherical aberration, field curvature, and distortion of the photographing lens of FIG. 4. Examples of the field curvature include tangential field curvature T and sagittal field curvature S. FIG. 6 is a view illustrating coma aberration of the photographing lens of FIG. 4.

<Embodiment 3>

Figure 7:
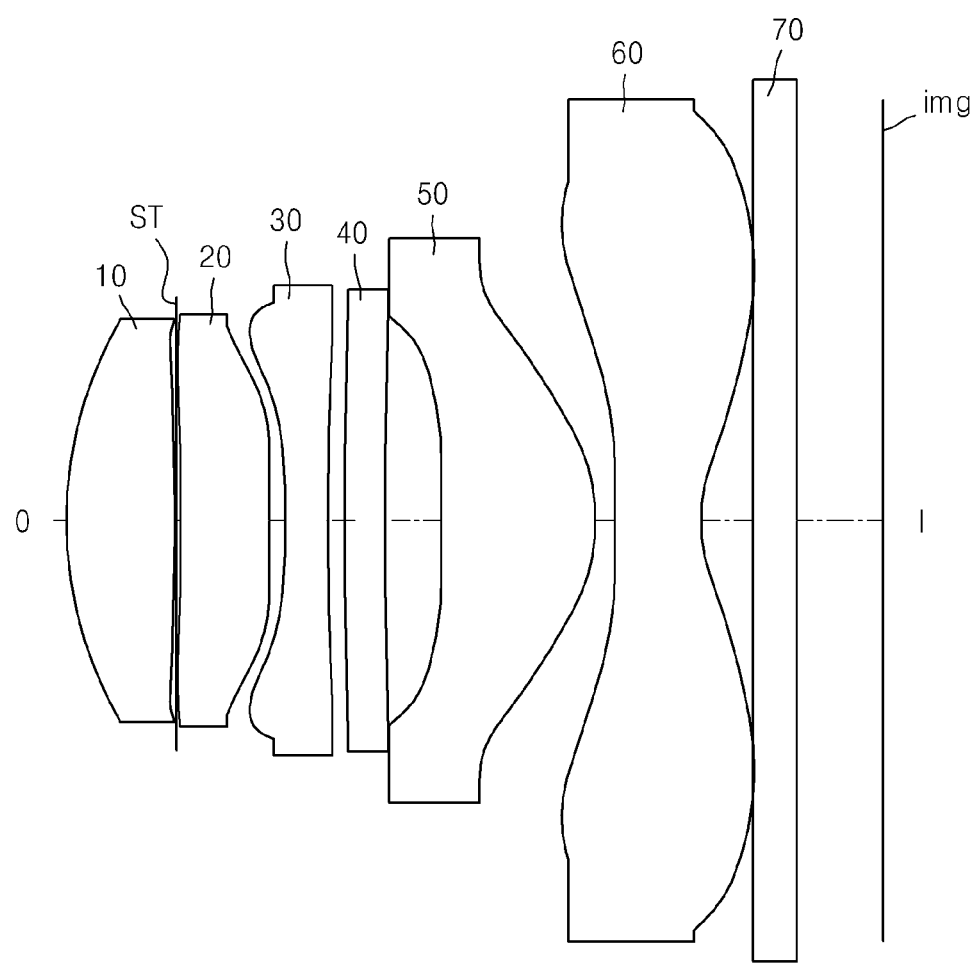
FIG. 7 is a view illustrating a photographing lens according to another embodiment.

FIG. 7 is a view illustrating a photographing lens according to another embodiment, and design data of FIG. 7 is shown in Table 5 below.

In FIG. 7, refractive powers of the first through sixth lenses 10 through 60 are, respectively, positive, positive, negative, positive, positive, and negative, and the stop ST is disposed on the image-side surface of the first lens 10. An f-number is f/2.08, a half angle of view is 33.83°, an optical total length is 9.50 mm, and a total focal length f is 7.31 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 5

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2* | 3.736 | 1.224 | 1.531 | 55.75 |
| 3(ST)* | −18.365 | 0.040 | | |
| 4* | −45.176 | 1.000 | 1.531 | 55.75 |
| 5* | −19.628 | 0.268 | | |
| 6* | −7.520 | 0.550 | 1.633 | 23.36 |
| 7* | 49.573 | 0.177 | | |
| 8* | 42.687 | 0.509 | 1.633 | 23.36 |
| 9 | 57.313 | 0.542 | | |
| 10* | −14.358 | 1.834 | 1.531 | 55.75 |
| 11* | −1.713 | 0.296 | | |
| 12 | infinity | 0.000 | | |
| 13* | −8.708 | 0.946 | 1.531 | 55.75 |
| 14* | 1.918 | 0.494 | | |
| 15 | infinity | 0.500 | 1.5168 | 64.2 |
| 16 | infinity | 1.124 | | |
| img | infinity | 0.000 | | |

A conic constant K and aspheric coefficients A, B, C, D, and E are shown in Table 6 below.

Figure 8:
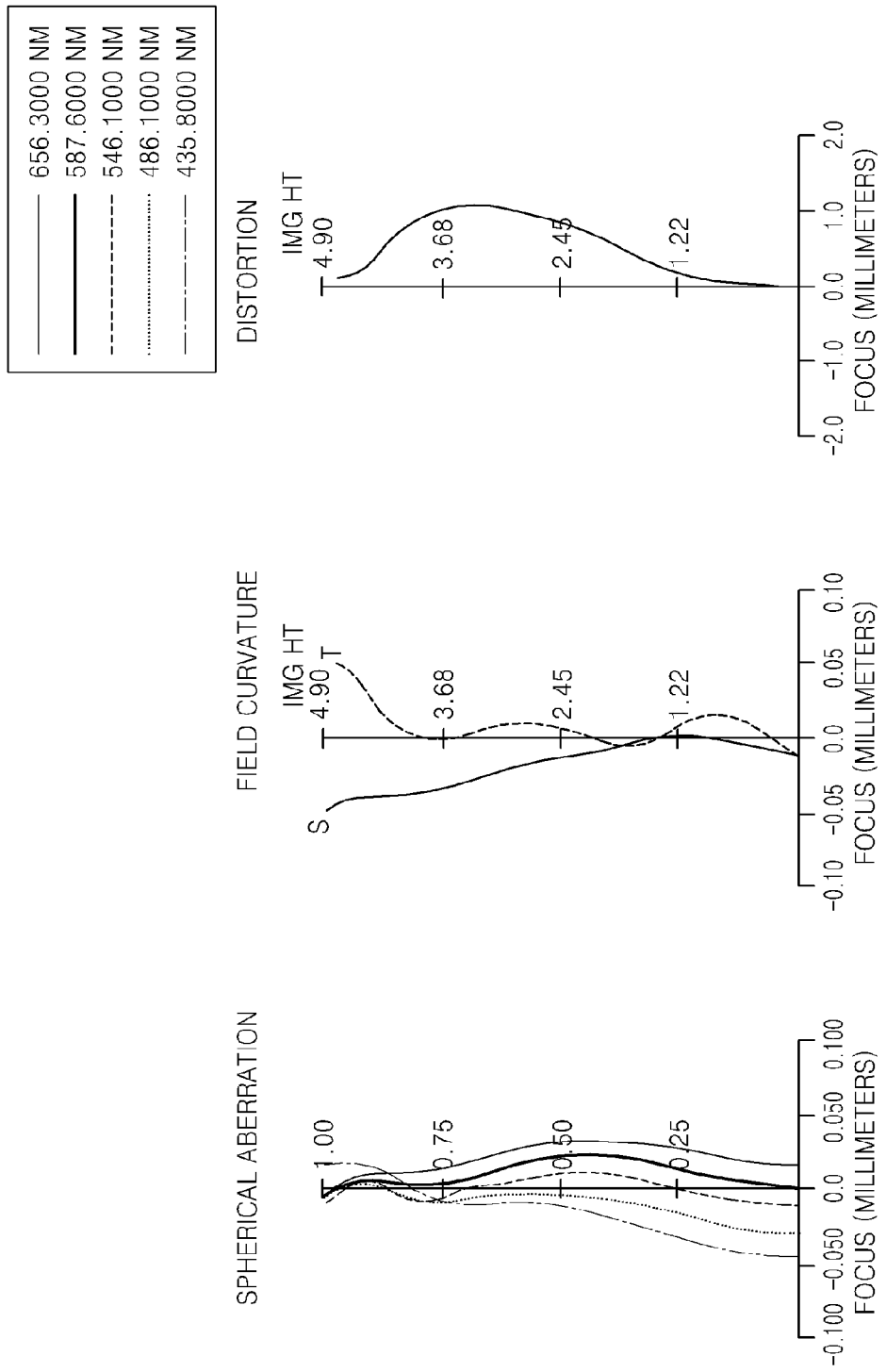
FIG. 8 is a view illustrating longitudinal spherical aberration, field curvature, and distortion of the photographing lens of FIG. 7.
Figure 9:
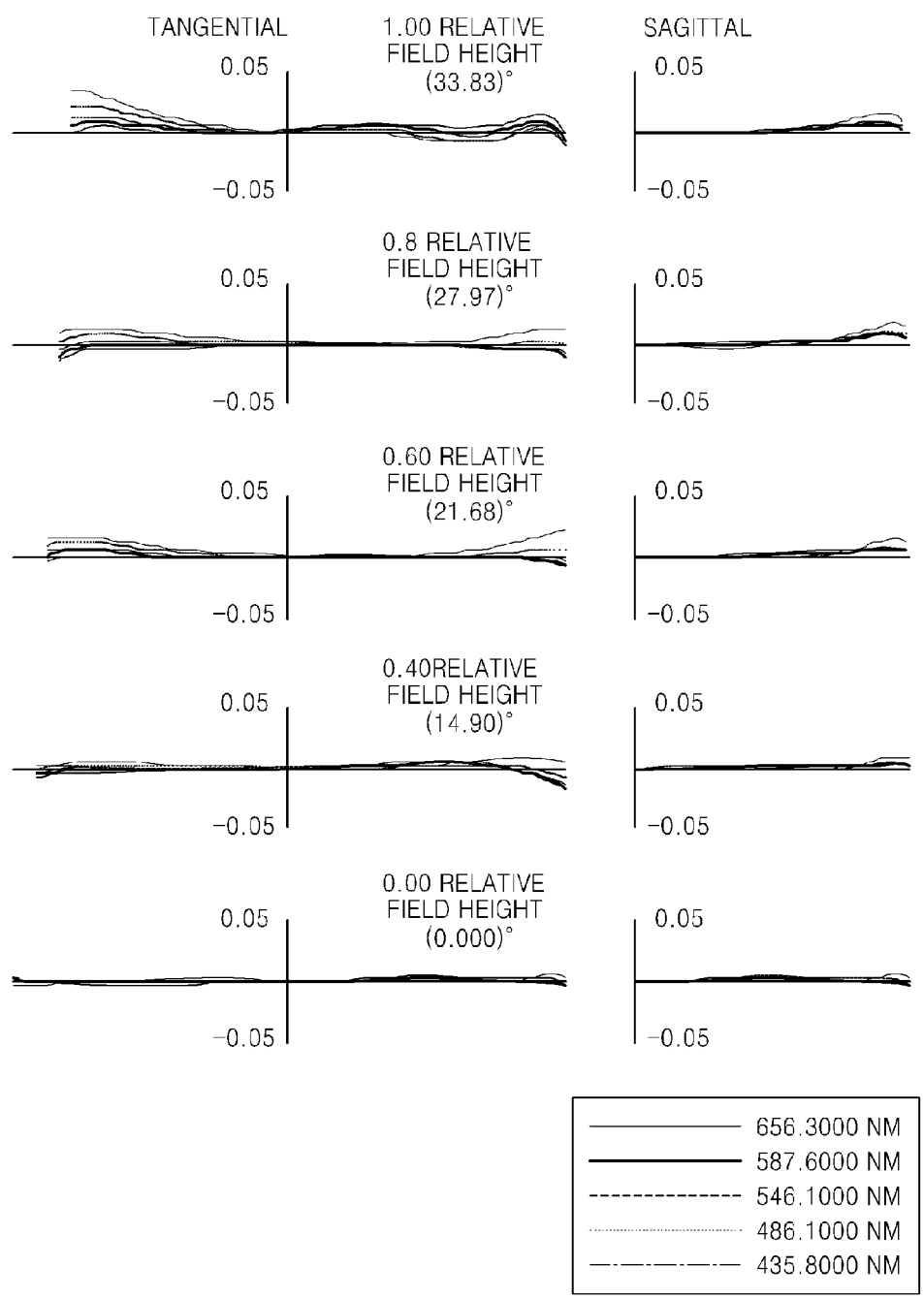
FIG. 9 is a view illustrating coma aberration of the photographing lens of FIG. 7.

FIG. 8 is a view illustrating longitudinal spherical aberration, field curvature, and distortion of the photographing lens of FIG. 7. Examples of the field curvature include tangential field curvature T and sagittal field curvature S. FIG. 9 is a view illustrating coma aberration of the photographing lens of FIG. 7.

<Embodiment 4>

Figure 10:
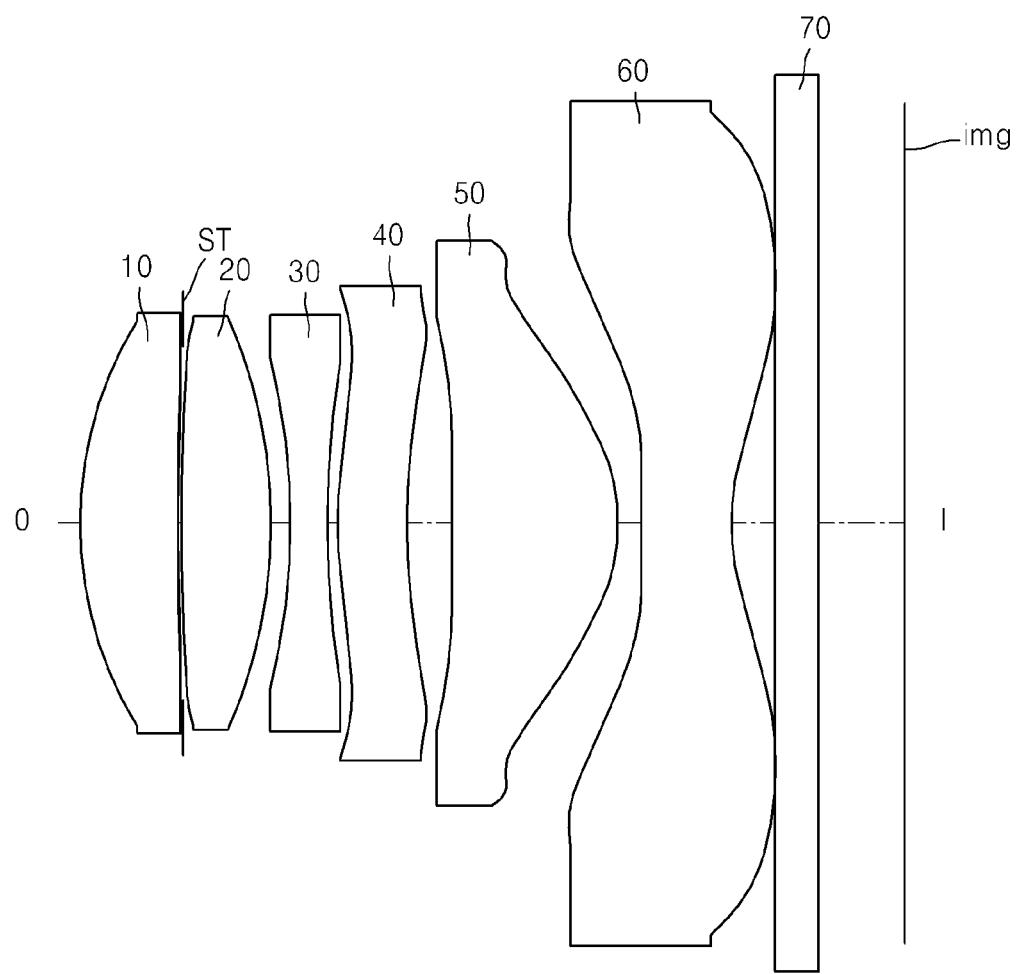
FIG. 10 is a view illustrating a photographing lens according to another embodiment.

FIG. 10 is a view illustrating a photographing lens according to another embodiment, and design data of FIG. 10 is shown in Table 7 below. In FIG. 10, refractive powers of the first through sixth lenses 10 through 60 are, respectively, positive, positive, negative, positive, positive, and negative, and the stop ST is disposed between the first lens 10 and the second lens 20.

An f-number is f/1.85, a half angle of view is 34.42°, an optical total length is 9.6 mm, and a total focal length f is 7.15 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 7

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2* | 3.704 | 1.111 | 1.531 | 55.75 |
| 3* | 40.296 | 0.055 | | |
| 4(ST) | infinity | 0.015 | | |
| 5 | infinity | 0.000 | | |
| 6* | 71.040 | 0.999 | 1.531 | 55.75 |
| 7* | −30.226 | 0.218 | | |
| 8* | −12.454 | 0.450 | 1.651 | 21.54 |
| 9* | 19.486 | 0.112 | | |
| 10* | 5.052 | 0.769 | 1.531 | 55.75 |
| 11* | 4.965 | 0.542 | | |
| 12* | −40.382 | 1.910 | 1.531 | 55.75 |
| 13* | −1.842 | 0.292 | | |
| 14 | infinity | 0.000 | | |
| 15* | −21.292 | 1.000 | 1.531 | 55.75 |
| 16* | 1.907 | 0.527 | | |
| 17 | infinity | 0.500 | 1.517 | 64.20 |
| 18 | infinity | 1.090 | | |
| img | infinity | 0.010 | | |

A conic constant K and aspheric coefficients A, B, C, D, and E are shown in Table 8 below.

TABLE 6

| Lens Surface | K | A | B | C | D | E |
|---|---|---|---|---|---|---|
| 2 | 0.0000 | −1.8525E−03 | −6.9675E−05 | −9.2157E−05 | −5.4981E−06 | −1.3173E−06 |
| 3 | 0.0000 | 6.3430E−03 | −3.7644E−03 | 7.4794E−04 | −2.6608E−05 | |
| 4 | 0.0000 | 6.3430E−03 | −3.7644E−03 | 7.4794E−04 | −2.6608E−05 | |
| 5 | 0.0000 | −1.1619E−02 | −3.5710E−03 | 3.3977E−04 | 5.0705E−05 | |
| 6 | 0.0000 | −6.4964E−03 | −4.1346E−03 | 5.2524E−04 | 7.0144E−05 | 6.0727E−06 |
| 7 | 0.0000 | 6.3430E−03 | −2.0212E−03 | 7.6024E−04 | −2.0097E−04 | 2.5164E−05 |
| 8 | 0.0000 | 9.1335E−04 | 0.0000E+00 | 0.0000E+00 | 0.0000E+00 | |
| 10 | 0.0000 | −1.9936E−03 | −3.6948E−03 | 8.2248E−04 | −9.3383E−05 | |
| 11 | −4.7203 | −3.0654E−02 | 8.5087E−03 | −1.9677E−03 | 2.6491E−04 | −1.2412E−05 |
| 13 | 0.0000 | −1.9441E−02 | 2.5083E−03 | −4.0198E−05 | −6.3087E−06 | 2.5327E−07 |
| 14 | −7.6846 | −1.0968E−02 | 1.2009E−03 | −8.6132E−05 | 3.0005E−06 | −4.2162E−08 |

TABLE 8

| Lens surface | K | A | B | C | D | E |
|---|---|---|---|---|---|---|
| 2 | 0.0000 | −9.9552E−04 | −2.1858E−04 | −6.6937E−05 | 2.1471E−05 | −5.1922E−06 |
| 3 | 0.0000 | 6.3430E−03 | −3.7644E−03 | 7.4794E−04 | −2.6608E−05 | |
| 6 | 0.0000 | 6.3430E−03 | −3.7644E−03 | 7.4794E−04 | −2.6608E−05 | |
| 7 | 0.0000 | −1.1406E−02 | −2.2524E−03 | 4.6287E−04 | −2.3269E−05 | |
| 8 | 0.0000 | 1.7339E−03 | −4.0349E−03 | 4.7947E−04 | −2.4385E−06 | 5.5978E−06 |
| 9 | 0.0000 | 6.3430E−03 | −2.0212E−03 | 7.6024E−04 | −2.0097E−04 | 2.2942E−05 |
| 10 | 0.0000 | −2.1638E−02 | 1.0071E−03 | 0.0000E+00 | 0.0000E+00 | |
| 11 | 0.0000 | −1.2414E−02 | 0.0000E+00 | 0.0000E+00 | 0.0000E+00 | |
| 12 | 0.0000 | 1.8395E−03 | −2.6981E−03 | 5.5056E−04 | −4.8270E−05 | |
| 13 | −5.0867 | −3.0747E−02 | 8.6463E−03 | −1.9430E−03 | 2.5498E−04 | −1.1882E−05 |
| 15 | 0.0000 | −2.4814E−02 | 2.5310E−03 | −2.8953E−05 | −5.3095E−06 | 1.8505E−07 |
| 16 | −6.4131 | −1.2137E−02 | 1.3061E−03 | −9.1310E−05 | 3.2099E−06 | −4.5487E−08 |

Figure 11:
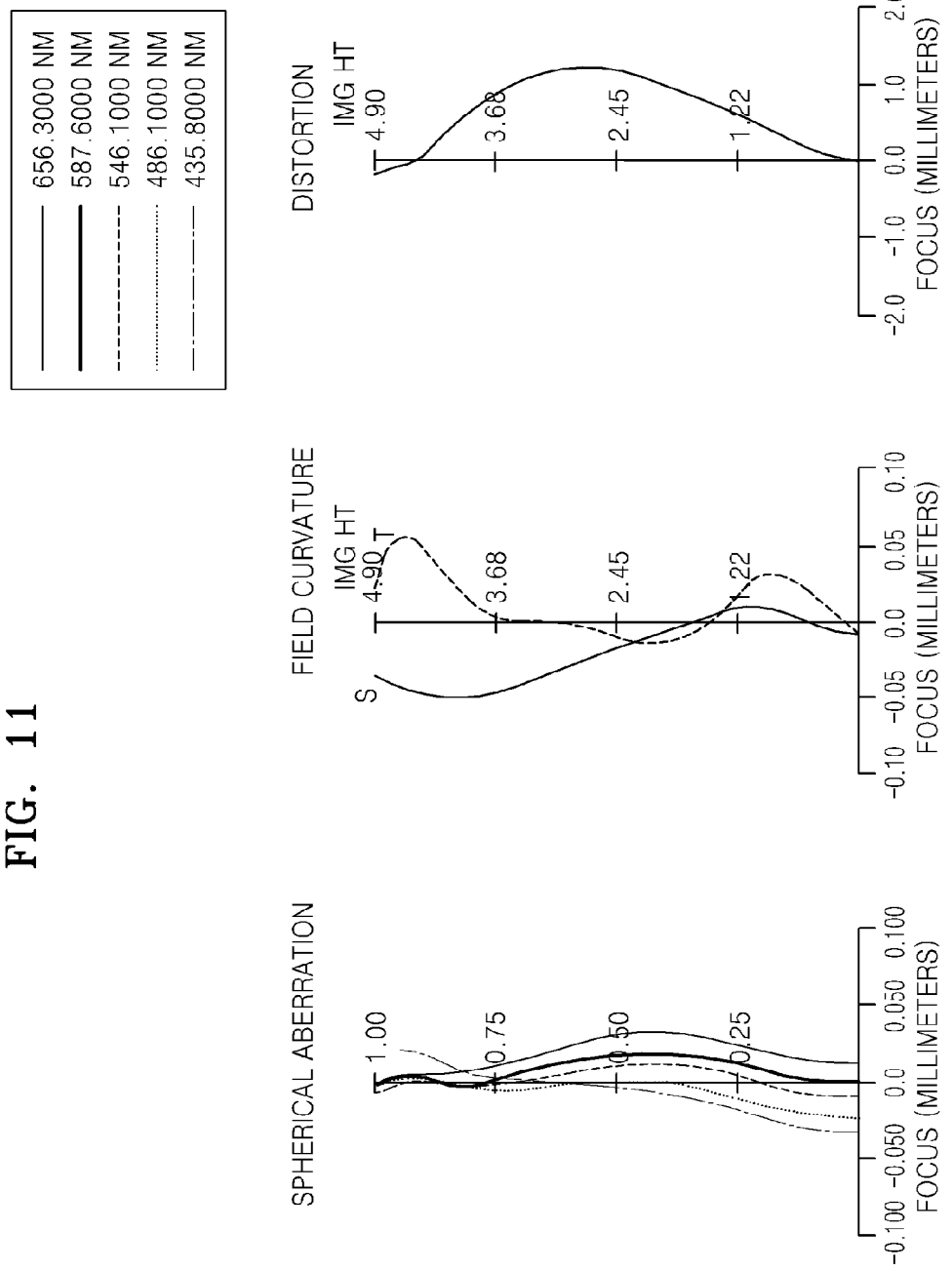
FIG. 11 is a view illustrating longitudinal spherical aberration, field curvature, and distortion of the photographing lens of FIG. 10.
Figure 12:
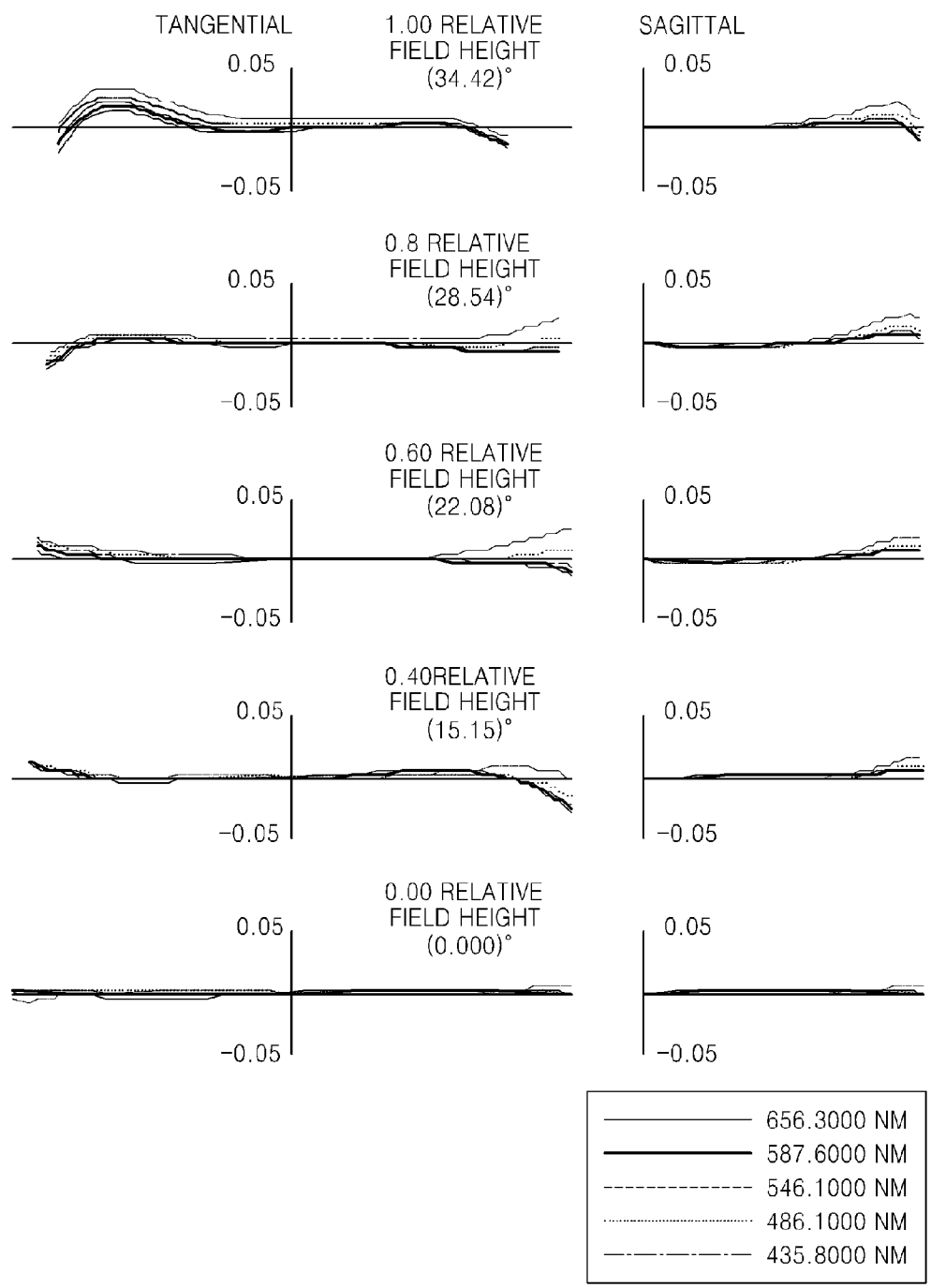
FIG. 12 is a view illustrating coma aberration of the photographing lens of FIG. 10.

FIG. 11 is a view illustrating longitudinal spherical aberration, field curvature, and distortion of the photographing lens of FIG. 10. Examples of the field curvature include tangential field curvature T and sagittal field curvature S. FIG. 12 is a view illustrating coma aberration of the photographing lens of FIG. 10.

<Embodiment 5>

Figure 13:
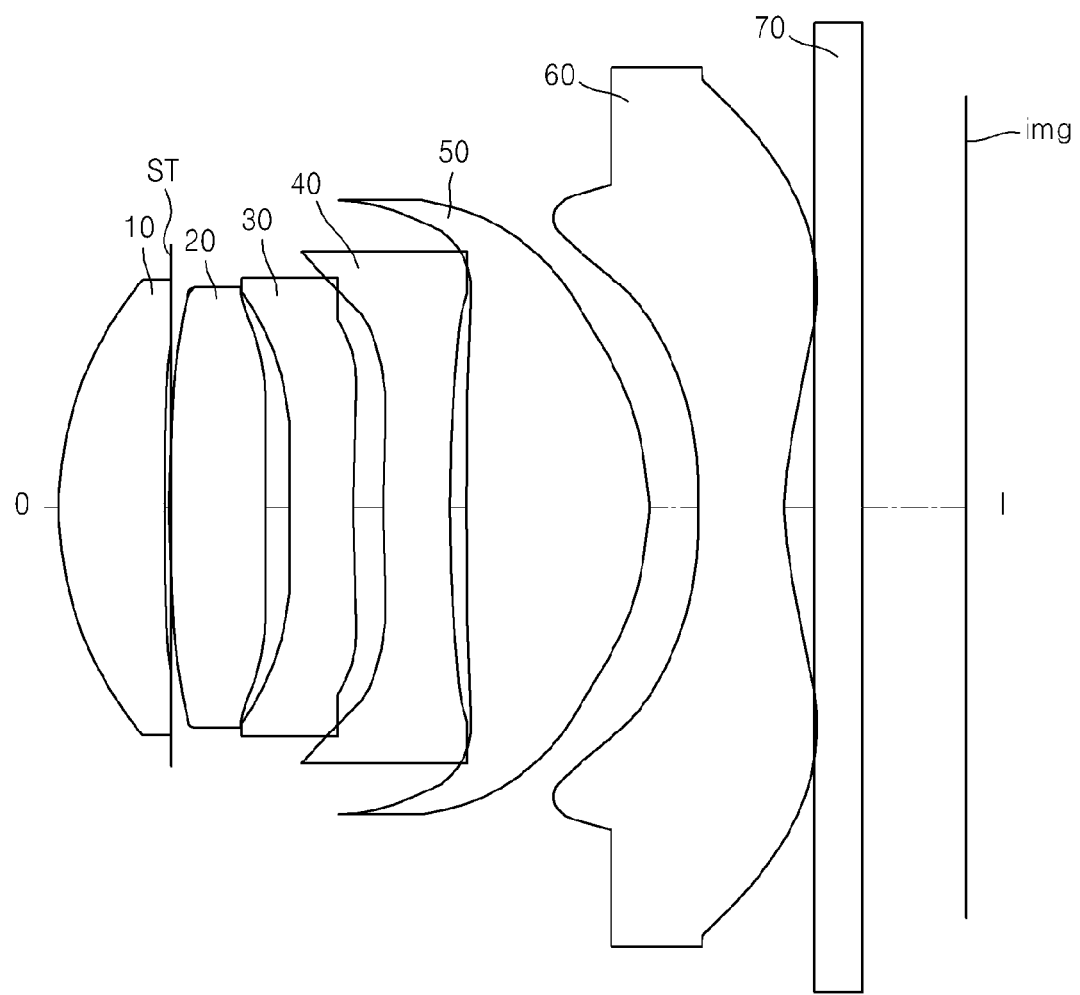
FIG. 13 is a view illustrating a photographing lens according to another embodiment.

FIG. 13 is a view illustrating a photographing lens according to another embodiment, and design data of FIG. 13 is shown in Table 9 below. In FIG. 13, refractive powers of the first through sixth lenses 10 through 60 are positive, negative, negative, negative, positive, and negative, and the stop ST is disposed on the image-side surface of the first lens 10.

An f-number is f/1.88, a half angle of view is 33.84°, an optical total length is 9.50 mm, and a total focal length f is 7.30 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 9

| Lens surface | Radius of curvature | Thickness | Refractive index (nd) | Abbe number (vd) |
|---|---|---|---|---|
| obj | infinity | infinity | | |
| 1 | infinity | 0.000 | | |

TABLE 9-continued

| Lens surface | Radius of curvature | Thickness | Refractive index (nd) | Abbe number (vd) |
|---|---|---|---|---|
| 2* | 3.914 | 1.098 | 1.544 | 56.11 |
| 3(ST)* | 1176.453 | 0.040 | | |
| 4* | 16.998 | 0.979 | 1.544 | 56.11 |
| 5* | 16.616 | 0.261 | | |
| 6* | −123.053 | 0.676 | 1.651 | 21.54 |
| 7* | 11.298 | 0.301 | | |
| 8* | 13.483 | 0.698 | 1.651 | 21.54 |
| 9* | 10.924 | 0.178 | | |
| 10* | 21.661 | 1.910 | 1.531 | 55.75 |
| 11* | −2.341 | 0.501 | | |
| 12 | infinity | 0.000 | | |
| 13* | −7.674 | 0.900 | 1.531 | 55.75 |
| 14* | 2.537 | 0.338 | | |
| 15 | infinity | 0.500 | 1.5168 | 64.2 |
| 16 | infinity | 1.120 | | |
| img | infinity | 0.000 | | |

A conic constant K and aspheric coefficients A, B, C, D, and E are shown in Table 10 below.

TABLE 10

| Lens surface | K | A | B | C | D | E |
|---|---|---|---|---|---|---|
| 2 | 0.0000 | −1.1432E−03 | 2.9298E−04 | −1.1242E−04 | 2.5922E−05 | 7.2999E−07 |
| 3 | 0.0000 | 6.2869E−03 | −2.0604E−03 | 3.4732E−04 | 5.7818E−05 | |
| 4 | 0.0000 | 5.8489E−03 | −3.2885E−03 | 6.1901E−04 | −2.0863E−05 | |
| 5 | 0.0000 | −1.3233E−02 | −4.5757E−03 | 5.2981E−04 | 5.5199E−05 | |
| 6 | 0.0000 | −2.0129E−02 | −3.7162E−03 | 6.0936E−04 | 2.4037E−04 | −4.1431E−05 |
| 7 | 0.0000 | −1.6747E−02 | −3.6408E−03 | 9.9216E−04 | −1.8064E−04 | 1.0369E−05 |
| 8 | 0.0000 | −1.4306E−02 | −1.4990E−03 | −5.8720E−04 | 9.0755E−05 | |
| 9 | 0.0000 | −7.0010E−03 | −4.2290E−04 | 1.7791E−04 | 1.9172E−05 | |
| 10 | 0.0000 | 1.1327E−03 | −2.1959E−03 | 5.0819E−04 | −4.4267E−05 | |
| 11 | −6.5379 | −2.0692E−02 | 6.5603E−03 | −1.5509E−03 | 1.9061E−04 | −9.3467E−06 |
| 13 | 0.0000 | −2.2557E−02 | 1.8699E−03 | −1.6465E−04 | −5.8154E−06 | 1.8811E−06 |
| 14 | −8.7147 | −1.2135E−02 | 1.1752E−03 | −9.3901E−05 | 3.4054E−06 | −4.0503E−08 |

Figure 14:
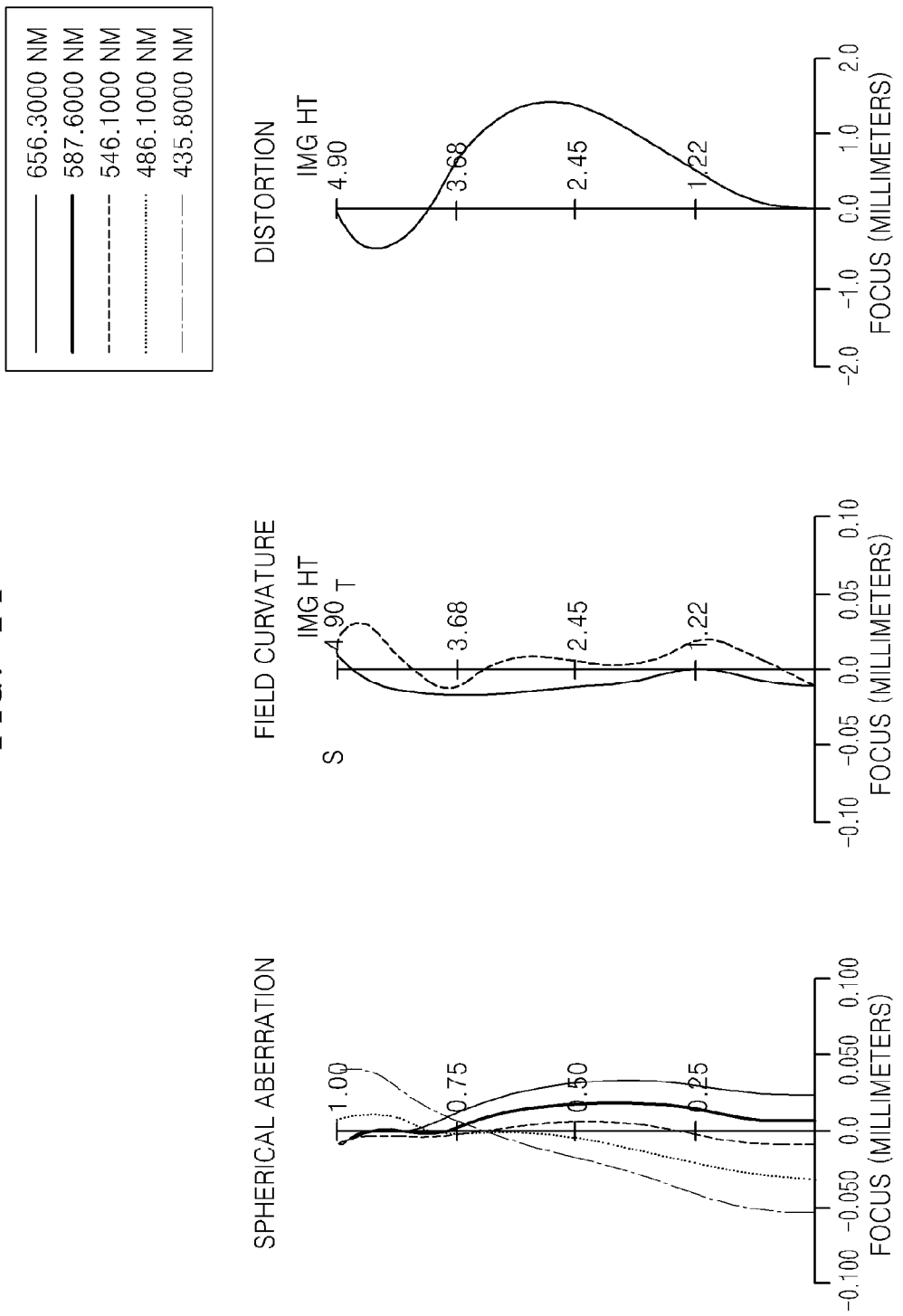
FIG. 14 is a view illustrating longitudinal spherical aberration, field curvature, and distortion of the photographing lens of FIG. 13.
Figure 15:
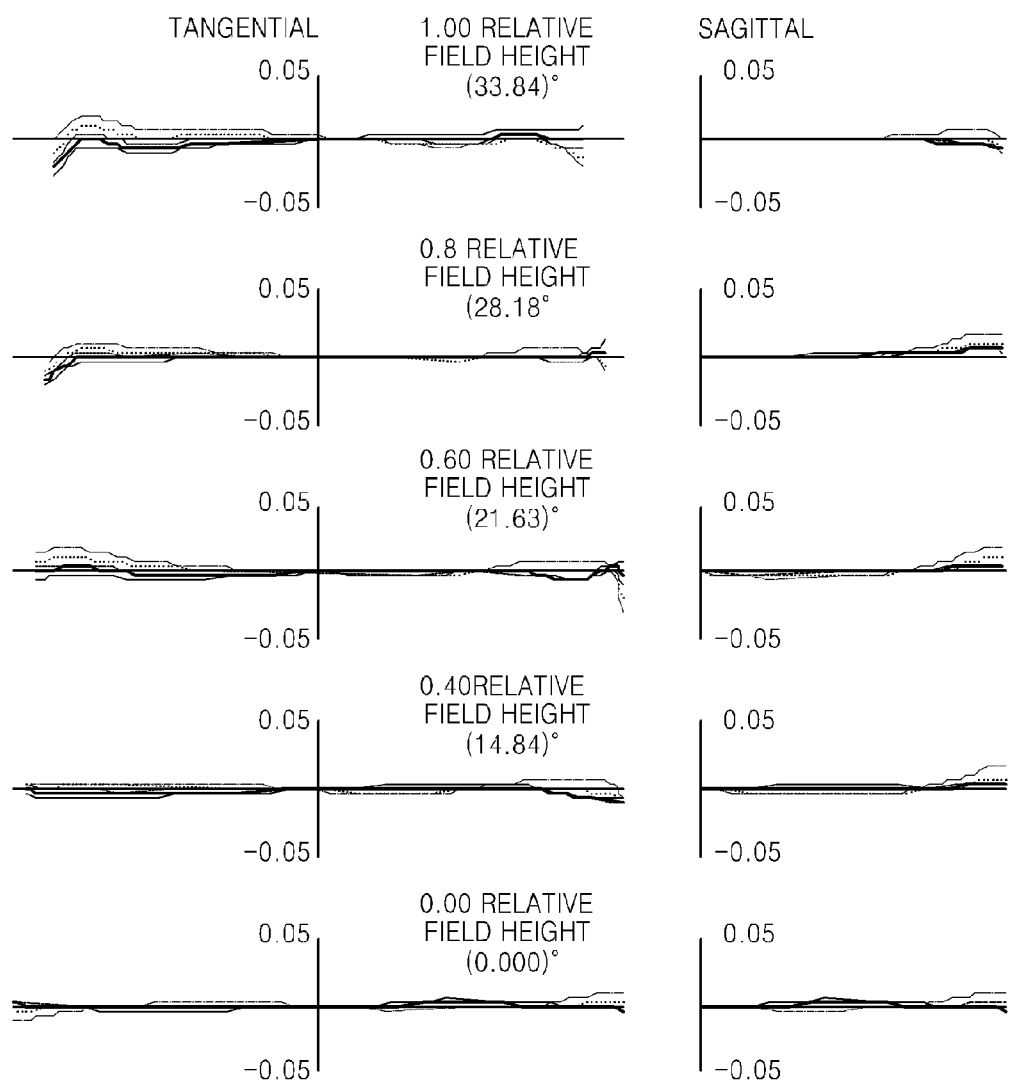
FIG. 15 is a view illustrating coma aberration of the photographing lens of FIG. 13.

FIG. 14 is a view illustrating longitudinal spherical aberration, field curvature, and distortion of the photographing lens of FIG. 13. Examples of the field curvature include tangential field curvature T and sagittal field curvature S. FIG. 15 is a view illustrating coma aberration of the photographing lens of FIG. 13.

<Embodiment 6>

Figure 16:
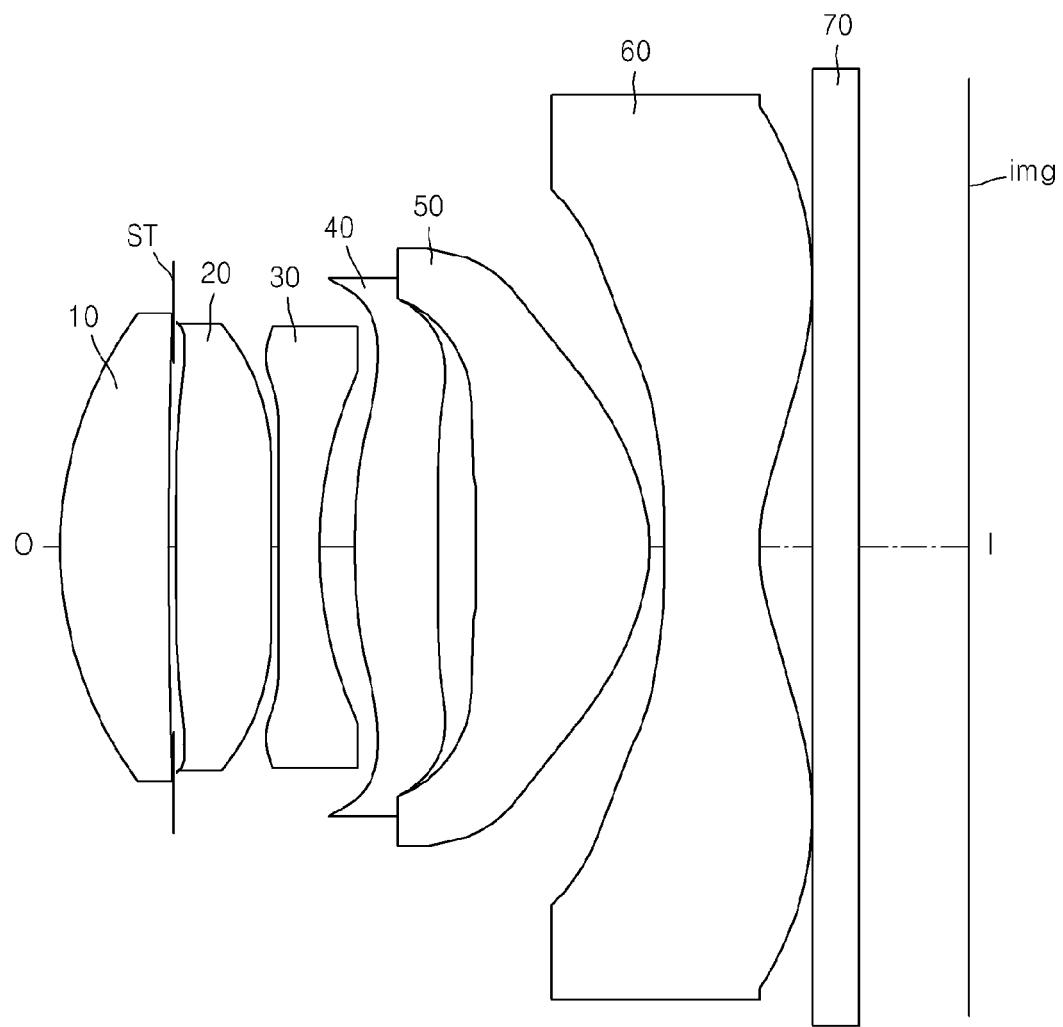
FIG. 16 is a view illustrating a photographing lens according to another embodiment.

FIG. 16 is a view illustrating a photographing lens according to another embodiment, and design data of FIG. 16 is shown in Table 11 below. In FIG. 16, refractive powers of the first through sixth lenses 10 through 60 are, respectively, positive, positive, negative, positive, positive, and negative, and the stop ST is disposed between the first lens 10 and the second lens 20.

An f-number is f/1.76, a half angle of view is 34.27°, an optical total length is 9.57 mm, and a total focal length f is 7.16 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 11

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2* | 3.750 | 1.132 | 1.531 | 55.75 |
| 3* | 160.038 | 0.040 | | |
| 4(ST) | infinity | 0.007 | | |
| 5 | infinity | 0.040 | | |
| 6* | 26.878 | 1.000 | 1.531 | 55.75 |
| 7* | −3053.126 | 0.068 | | |
| 8* | 39.683 | 0.450 | 1.633 | 23.36 |
| 9* | 5.254 | 0.378 | | |
| 10* | 5.405 | 0.737 | 1.544 | 56.11 |
| 11* | 6.329 | 0.542 | | |
| 12* | −38.312 | 1.838 | 1.544 | 56.11 |
| 13* | −1.731 | 0.168 | | |
| 14 | infinity | 0.000 | | |
| 15* | −18.584 | 1.000 | 1.544 | 56.11 |
| 16* | 1.823 | 0.570 | | |
| 17 | infinity | 0.500 | 1.517 | 64.20 |
| 18 | infinity | 1.090 | | |
| img | infinity | 0.010 | | |

A conic constant K and aspheric coefficients A, B, C, D, and E are shown in Table 12 below.

TABLE 12

| Lens surface | K | A | B | C | D | E |
|---|---|---|---|---|---|---|
| 2 | 0.0000 | −1.5251E−03 | 2.3529E−05 | −1.5014E−04 | 1.2791E−05 | 5.6189E−07 |
| 3 | 0.0000 | 6.3430E−03 | −3.7644E−03 | 7.4794E−04 | −2.6608E−05 | |
| 6 | 0.0000 | 7.5599E−03 | −4.1007E−03 | 7.9779E−04 | 1.9304E−05 | −1.6149E−05 |
| 7 | 1.2935E+06 | −9.7499E−03 | −3.6634E−03 | 5.9465E−04 | 1.1285E−06 | −5.5008E−06 |
| 8 | 0.0000 | −4.4689E−03 | −3.6925E−03 | 3.8892E−04 | 3.2468E−05 | 5.0219E−06 |
| 9 | 0.0000 | 6.3430E−03 | −2.0212E−03 | 7.6024E−04 | −2.0097E−04 | 2.9263E−05 |
| 10 | 0.0000 | −7.3741E−03 | −4.8415E−04 | 3.7113E−05 | −1.5671E−05 | |
| 11 | 0.0000 | −6.7124E−03 | −5.2755E−04 | −1.7824E−05 | −2.0933E−05 | |
| 12 | 0.0000 | −4.4577E−05 | −2.9062E−03 | 5.8310E−04 | −7.0060E−05 | |
| 13 | −5.2396 | −3.0458E−02 | 8.7602E−03 | −1.9850E−03 | 2.5387E−04 | −1.2538E−05 |
| 15 | 0.0000 | −2.1011E−02 | 2.4645E−03 | −4.8044E−05 | −6.1977E−06 | 2.3056E−07 |
| 16 | −6.8184 | −1.1343E−02 | 1.2755E−03 | −9.1310E−05 | 3.1681E−06 | −4.1410E−08 |

Figure 17:
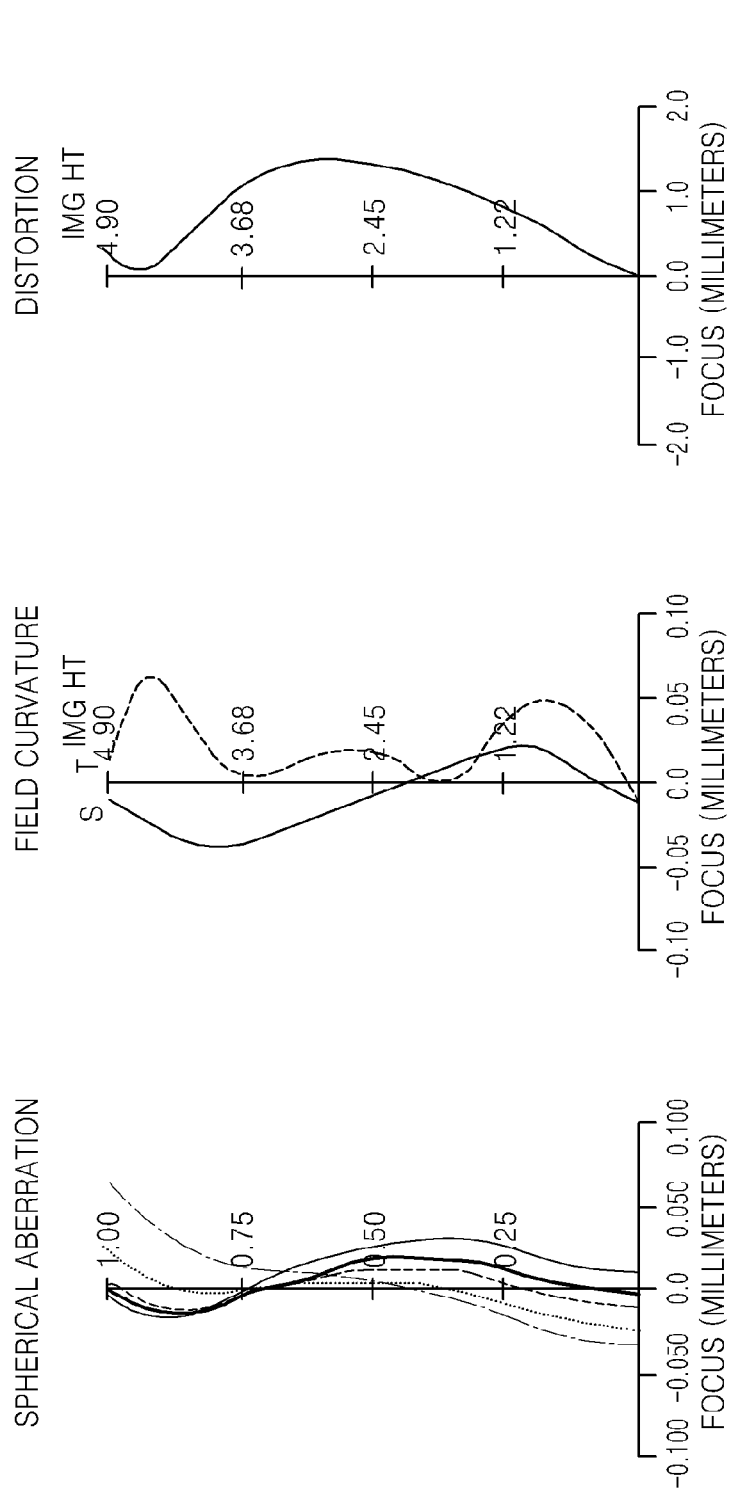
FIG. 17 is a view illustrating longitudinal spherical aberration, field curvature, and distortion of the photographing lens of FIG. 16.
Figure 18:
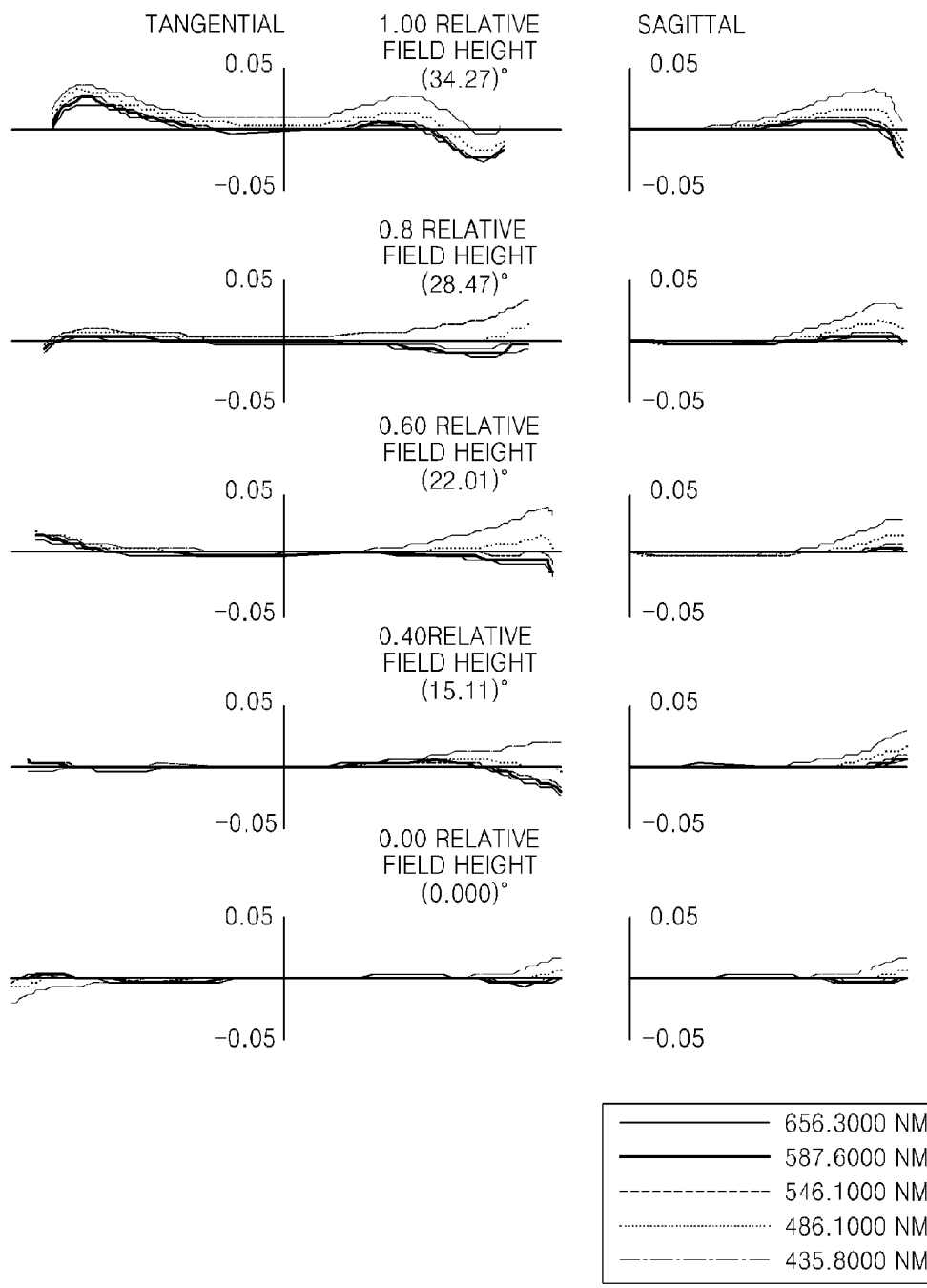
FIG. 18 is a view illustrating coma aberration of the photographing lens of FIG. 16.

FIG. 17 is a view illustrating longitudinal spherical aberration, field curvature, and distortion of the photographing lens of FIG. 17. Examples of the field curvature include tangential field curvature T and sagittal field curvature S. FIG. 18 is a view illustrating coma aberration of the photographing lens of FIG. 16.

<Embodiment 7>

Figure 19:
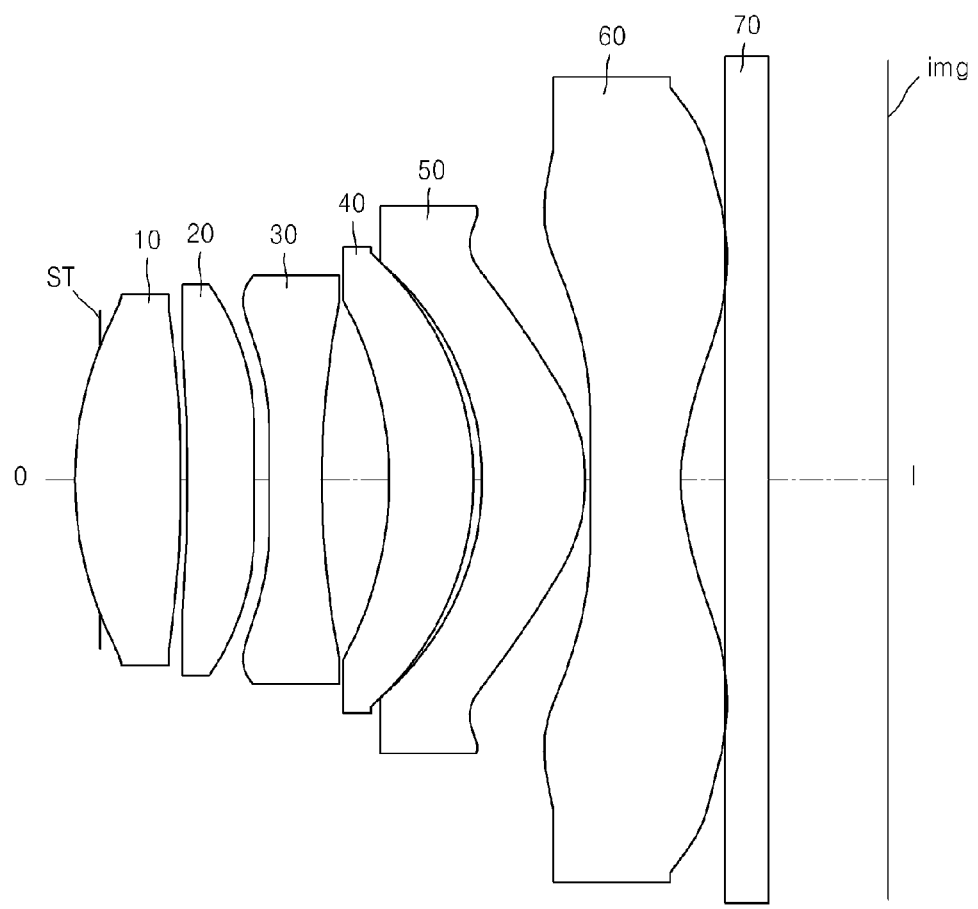
FIG. 19 is a view illustrating a photographing lens according to another embodiment.

FIG. 19 is a view illustrating a photographing lens according to another embodiment, and design data of FIG. 19 is shown in Table 13 below. In FIG. 19, refractive powers of the first through sixth lenses are positive, positive, negative, positive, positive, and negative, and the stop ST is disposed on the object-side of the first lens 10.

An f-number is f/2.34, a half angle of view is 32.93°, an optical total length is 9.38 mm, and a total focal length f is 7.48 mm.

(wavelengths: C-line corresponds to 656.3 nm, d-line corresponds to 587.6 nm, e-line corresponds to 546.1 nm, g-line corresponds to 435.8 nm, and F-line corresponds to 486.1 nm)

TABLE 13

| Lens surface | Radius of curvature | Thickness | Refractive index (nd) | Abbe number (vd) |
|---|---|---|---|---|
| obj | infinity | infinity | | |
| 1 | infinity | 0.000 | | |
| 2(ST) | infinity | −0.300 | | |
| 3* | 3.722 | 1.238 | 1.531 | 55.75 |
| 4* | −12.762 | 0.060 | | |
| 5* | −28.184 | 0.800 | 1.531 | 55.75 |
| 6* | −17.897 | 0.180 | | |
| 7* | −10.179 | 0.600 | 1.633 | 23.36 |
| 8* | 16.606 | 0.756 | | |
| 9* | −6.957 | 1.010 | 1.531 | 55.75 |
| 10* | −3.629 | 0.100 | | |
| 11* | −3.717 | 1.223 | 1.531 | 55.75 |
| 12* | −1.484 | 0.060 | | |
| 13* | −29.964 | 1.026 | 1.531 | 55.75 |
| 14* | 1.611 | 0.526 | | |
| 15 | infinity | 0.500 | 1.517 | 64.20 |
| 16 | infinity | 1.601 | | |
| img | infinity | 0.000 | | |

A conic constant K and aspheric coefficients A, B, C, D, and E are shown in Table 14 below.

TABLE 14

| Lens surface | K | A | B | C | D | E |
|---|---|---|---|---|---|---|
| 3 | 0.0000 | −1.8027E−03 | −3.2382E−04 | −1.2929E−05 | −3.9568E−05 | 1.9183E−06 |
| 4 | 0.0000 | 6.0701E−03 | −3.4984E−03 | 6.7501E−04 | −2.3320E−05 | |
| 5 | 0.0000 | 6.0701E−03 | −3.4984E−03 | 6.7501E−04 | −2.3320E−05 | |
| 6 | 0.0000 | −9.7814E−03 | −4.4816E−03 | 4.9820E−04 | 3.1604E−05 | |
| 7 | 0.0000 | −2.8075E−03 | −4.5895E−03 | 4.8707E−04 | 7.4779E−05 | 3.3252E−06 |
| 8 | 0.0000 | 6.0701E−03 | −1.8784E−03 | 6.8611E−04 | −1.7613E−04 | 2.2139E−05 |
| 9 | 0.0000 | −6.8502E−03 | −4.0093E−03 | 1.0724E−03 | −8.5010E−05 | |
| 10 | −7.8443 | −3.5081E−02 | 8.4427E−03 | −1.8401E−03 | 2.2027E−04 | −8.9441E−06 |
| 11 | −6.1980 | −3.0021E−02 | 8.6803E−03 | −1.9013E−03 | 2.1980E−04 | −1.2427E−05 |
| 12 | −4.3127 | −3.1318E−02 | 8.8897E−03 | −1.8204E−03 | 2.2437E−04 | −9.9222E−06 |
| 13 | 0.0000 | −1.8865E−02 | 2.0791E−03 | −2.6293E−05 | −4.6233E−06 | 1.6586E−07 |
| 14 | −6.7975 | −1.2093E−02 | 1.2255E−03 | −8.6343E−05 | 3.1833E−06 | −4.6536E−08 |

Figure 20:
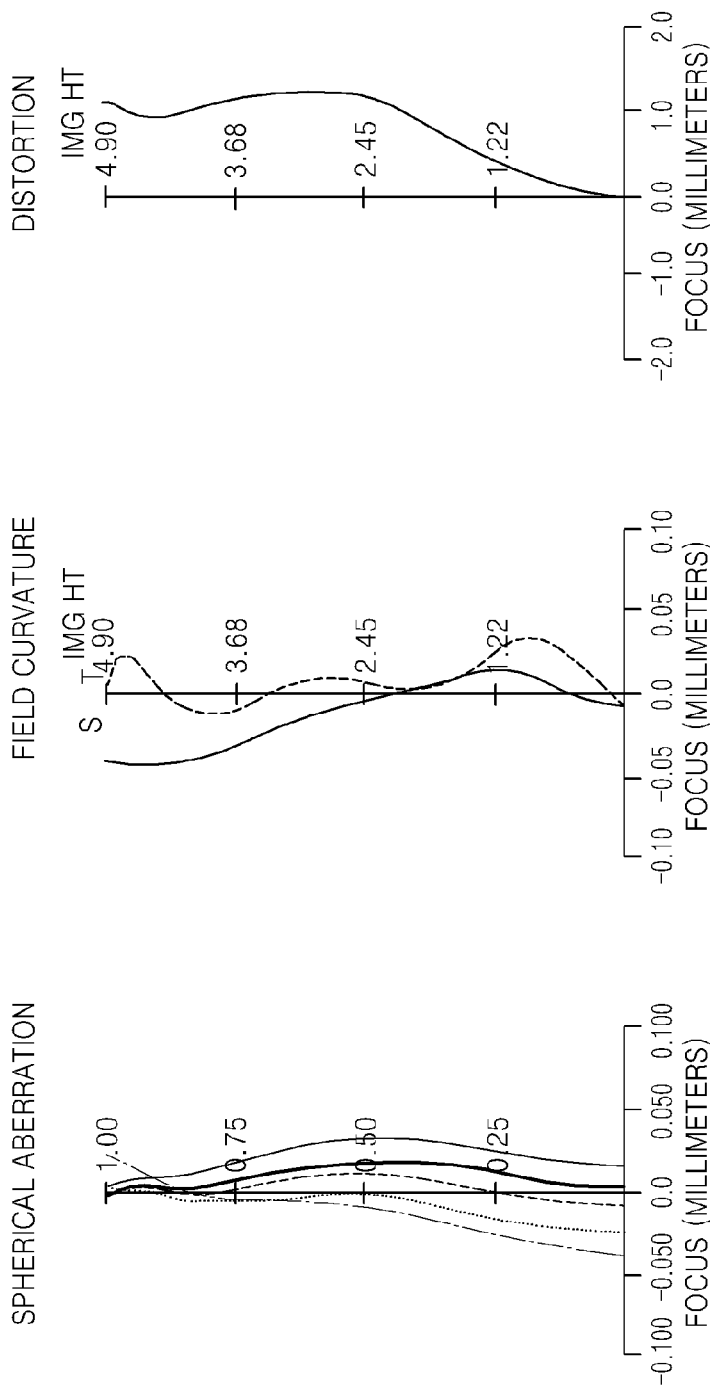
FIG. 20 is a view illustrating longitudinal spherical aberration, field curvature, and distortion of the photographing lens of FIG. 19.
Figure 21:
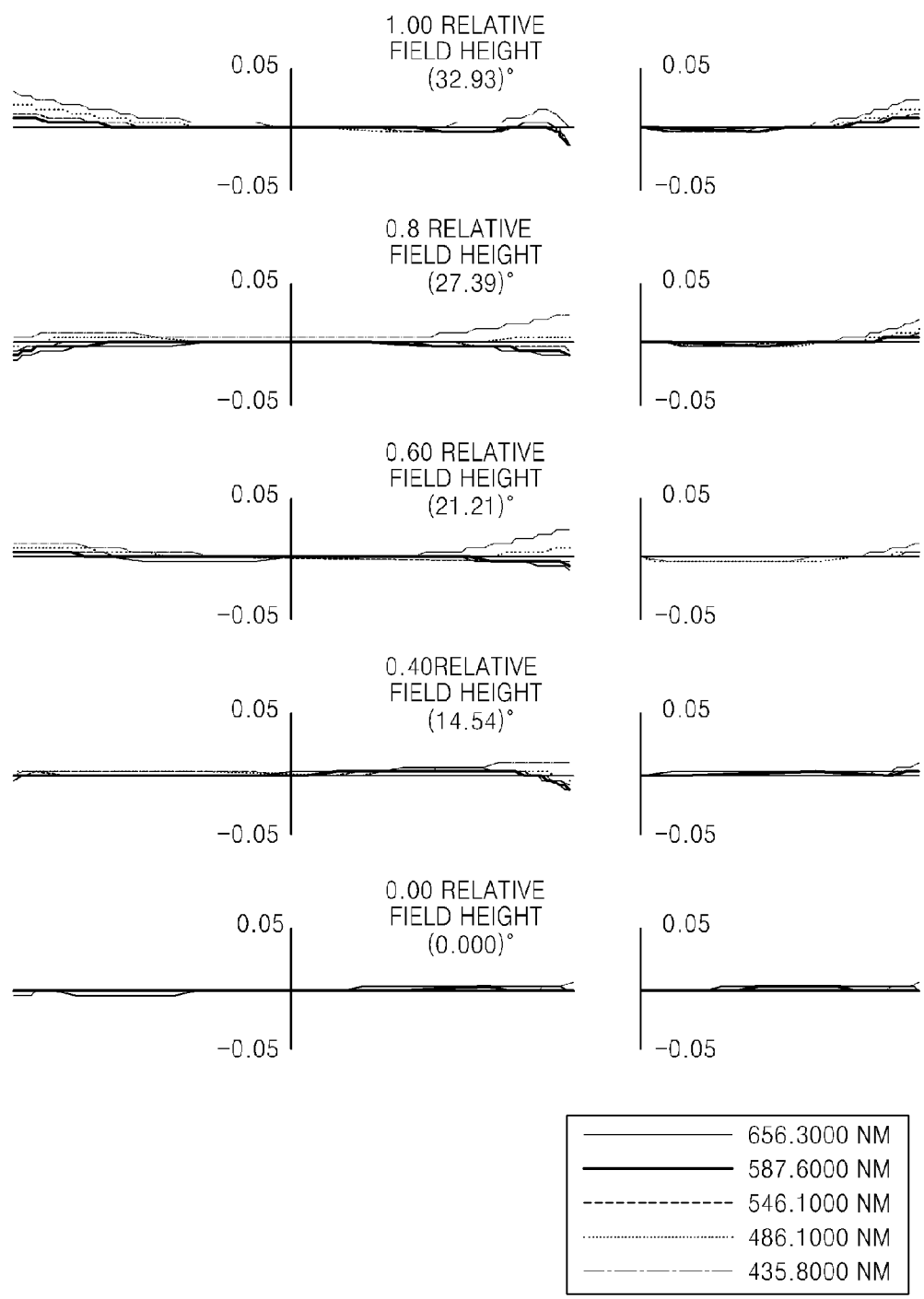
FIG. 21 is a view illustrating coma aberration of the photographing lens of FIG. 19.

FIG. 20 is a view illustrating longitudinal spherical aberration, field curvature, and distortion of the photographing lens of FIG. 19. Examples of the field curvature include tangential field curvature T and sagittal field curvature S. FIG. 21 is a view illustrating coma aberration of the photographing lens of FIG. 19.

Lens data of Embodiments 1 through 7 is shown in Table 15 below.

TABLE 15

| Lens data | Embodiment 1 | Embodiment 2 | Embodiment 3 | Embodiment 4 | Embodiment 5 | Embodiment 6 | Embodiment 7 |
|---|---|---|---|---|---|---|---|
| Total length (TL) (mm) | 9.43 | 9.33 | 9.33 | 9.43 | 9.33 | 9.40 | 9.21 |
| Total focal length (f) (mm) | 7.28 | 7.05 | 7.31 | 7.15 | 7.30 | 7.16 | 7.48 |
| F-number | 1.88 | 1.88 | 2.08 | 1.85 | 1.88 | 1.76 | 2.34 |
| Half angle of view (°) | 33.73 | 34.62 | 33.83 | 34.42 | 33.84 | 34.27 | 32.93 |
| First lens focal length (f1) (mm) | 6.63 | 5.99 | 5.93 | 7.57 | 7.18 | 7.18 | 5.55 |
| Second lens focal length (f2) (mm) | 33.85 | −248.88 | 64.20 | 39.89 | −14202.73 | 49.96 | 89.50 |
| Third lens focal length (f3) (mm) | −7.97 | −10.70 | −10.18 | −11.49 | −15.70 | −9.52 | −9.79 |
| Fourth lens focal length (f4) (mm) | 61.48 | 83.31 | 258.18 | 259.99 | −98.15 | 52.83 | 12.87 |
| Fifth lens focal length (f5) (mm) | 3.26 | 3.46 | 3.47 | 3.56 | 4.07 | 3.26 | 3.89 |
| Sixth lens focal length (f6) (mm) | −2.89 | −3.06 | −2.86 | −3.23 | −3.47 | −2.99 | −2.83 |

Embodiments 1 through 7 satisfy Inequalities 1 through 4 and 5 through 10, as detailed in Table 16 below.

TABLE 16

| Inequality | Embodiment 1 | Embodiment 2 | Embodiment 3 | Embodiment 4 | Embodiment 5 | Embodiment 6 | Embodiment 7 |
|---|---|---|---|---|---|---|---|
| $20 < V1 - V3 < 45$ | 32.4 | 32.8 | 32.4 | 34.2 | 34.6 | 32.4 | 32.4 |
| $0.2 < |R11 + R22|/|R11 - R22| < 2.5$ | 0.68 | 0.77 | 0.68 | 0.78 | 1.62 | 1.00 | 0.66 |
| $0.70 < f/f12 < 1.9$ | 1.27 | 1.14 | 1.31 | 1.09 | 1.04 | 1.12 | 1.40 |
| $0.9 < TL/f < 2.0$ | 1.30 | 1.32 | 1.28 | 1.32 | 1.28 | 1.31 | 1.23 |
| $0.3 < |f/f3| < 1.5$ | 1.27 | 1.14 | 1.31 | 0.62 | 1.04 | 0.75 | 1.40 |
| $1.0 < f/f5 < 3.0$ | 2.23 | 2.04 | 2.10 | 2.01 | 1.79 | 2.20 | 1.92 |
| $1.58 < N3 < 1.68$ | 1.633 | 1.633 | 1.633 | 1.651 | 1.651 | 1.633 | 1.633 |
| $1.51 < N5 < 1.56$ | 1.531 | 1.531 | 1.531 | 1.531 | 1.531 | 1.544 | 1.531 |
| $1.51 < N6 < 1.56$ | 1.531 | 1.531 | 1.531 | 1.531 | 1.531 | 1.544 | 1.531 |
| $Yimg/Tan\theta > 6.0$ mm | 7.34 mm | 7.10 mm | 7.31 mm | 7.15 mm | 7.31 mm | 7.19 mm | 7.57 mm |

The photographing lens according to the one or more embodiments may be small and bright. The photographing lens may be applied to an electronic apparatus employing a large image sensor. The photographing lens may be applied to any of various photographing and electronic apparatuses such as a digital camera, an interchangeable lens camera, a video camera, a hand phone camera, and a camera for a small mobile device.

For example, a camera for a mobile device may include a lens system suitable for a large image sensor, and may achieve an out-focusing effect with a shallow depth of field. A depth of field is proportional to an f-number. A deeper depth of field is obtained as a lens has a shorter focal length or a size of a stop is further reduced (that is, as an f-number is increased).

Accordingly, since a focal length is increased and thus a shallow depth of field is achieved when a large image sensor is applied to the photographing lens according to the one or more embodiments, an out-focusing effect that blurs a background may be provided.

When a large image sensor is employed, aberration may be increased and sensitivity may be increased. A low f-number may increase axial spherical aberration and off-axial coma aberration. The photographing lens according to the one or more embodiments may correct aberration due to the use of a large image sensor and may realize a bright optical system having a low f-number.

Figure 22:
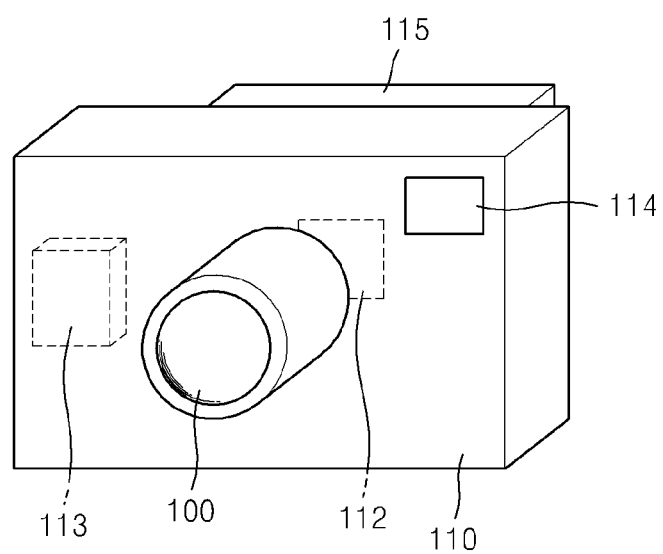
FIG. 22 is a perspective view illustrating a photographing apparatus including a photographing lens, according to an embodiment.

FIG. 22 is a perspective view illustrating a photographing apparatus 110 including a photographing lens 100, according to an embodiment. The photographing apparatus 110 is an embodiment of an electronic apparatus. The photographing apparatus 110 includes the photographing lens 100, and an image sensor 112 that receives an optical image formed by the photographing lens 100 and converts the optical image into an electrical image signal. Any of the photographing lenses described with reference to FIGS. 1 through 21 may be used as the photographing lens 100. The photographing apparatus 110 may include a recording unit 113 on which information corresponding to a subject image photoelectric-converted by the image sensor 112 is recorded, a viewfinder 114 that observes the subject image, and a display unit 115 on which the subject image is displayed. Although the viewfinder 114 and the display unit 115 are separately provided in FIG. 22, the present embodiment is not limited thereto and only the display unit 115 may be provided without the viewfinder 114. The photographing apparatus 110 of FIG. 22 is shown as an exemplary embodiment, but the present embodiment is not limited thereto, and may be applied to various photographing and electronic apparatuses, for example a camera, an optical device for a mobile device, a camera for a smart phone, etc. A small, bright, and high-performance photographing apparatus may be realized by applying the photographing lens according to any of the embodiments to a photographing or electronic apparatus such as a digital camera or a mobile camera.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing lens comprising:
   a first lens that comprises a convex object-side surface and has a positive refractive power;
   a second lens that comprises a convex image-side surface and has a positive or negative refractive power;
   a third lens that has a negative refractive power;
   a fourth lens that has a positive or negative refractive power;
   a fifth lens that comprises a convex image-side surface and has a positive refractive power; and
   a sixth lens that comprises an image-side surface that is concave near an optical axis, and has a negative refractive power,
   wherein the first through sixth lenses are sequentially arranged from an object side.

2. The photographing lens of claim 1, wherein the photographic lens satisfies $$20 < V1 - V3 < 45$$

where V1 is an Abbe number of the first lens, and V3 is an Abbe number of the third lens.

3. The photographing lens of claim 1, wherein the photographing lens satisfies $$0.2 < |R11 + R22|/|R11 - R22| < 2.5$$

where R11 is a radius of curvature of the object-side surface of the first lens, and R22 is a radius of curvature of the image-side surface of the second lens.

4. The photographing lens of claim 1, wherein the photographing lens satisfies $$0.7 < f/f12 < 1.9$$

where f is a total focal length of the photographing lens, and f12 is a combined focal length of the first lens and the second lens.

5. The photographing lens of claim 1, wherein the photographing lens satisfies $$0.9 < TL/f < 2.0$$

where TL is a distance on the optical axis between a vertex of the object-side surface of the first lens and an image plane, and f is a total focal length of the photographing lens.

6. The photographing lens of claim 1, wherein the third lens is a double-concave lens, or a meniscus lens whose image-side surface is concave.

7. The photographing lens of claim 6, wherein the photographing lens satisfies $$0.3 < |f/f3| < 1.5$$

where f is a total focal length of the photographing lens, and f3 is a focal length of the third lens.

8. The photographing lens of claim 1, wherein an object-side surface of the fourth lens is concave or convex.

9. The photographing lens of claim 1, wherein the image-side surface of the fifth lens has a convex meniscus shape.

10. The photographing lens of claim 9, wherein the photographing lens satisfies $$1.0 < f/f5 < 3.0$$

where f is a total focal length of the photographing lens, and f5 is a focal length of the fifth lens.

11. The photographing lens of claim 1, wherein the sixth lens is an aspheric lens that comprises the image-side surface that is concave near the optical axis, and has at least one inflection point.

12. The photographing lens of claim 1, wherein the photographing lens satisfies $$1.58 < N3 < 1.68$$

where N3 is a refractive index of the third lens at a d-line.

13. The photographing lens of claim 1, wherein the photographing lens satisfies $$1.51 < N5 < 1.56$$

$$1.51 < N6 < 1.56$$

where N5 is a refractive index of the fifth lens at a d-line, and N6 is a refractive index of the sixth lens at the d-line.

14. The photographing lens of claim 1, wherein the photographing lens satisfies $$Yimg/\tan \theta > 6.0 \text{ mm}$$

where Yimg is a maximum image height on an image plane, and Tan θ is a half angle of view at the maximum image height.

15. The photographing lens of claim 1, wherein a stop is provided between the first lens and the second lens, or is provided on the object side of the first lens.

16. The photographing lens of claim 1, wherein each of the third through sixth lenses is formed of a plastic material.

17. The photographing lens of claim 1, wherein camera shake is corrected by moving all of the first through sixth lenses.

18. The photographing lens of claim 1, wherein the photographing lens has an f-number ranging from 1.7 to 2.8.

19. The photographing lens of claim 1, wherein both surfaces of the third lens are aspheric surfaces.

20. The photographing lens of claim 1, wherein at least one surface of the fourth lens is an aspheric surface.

21. The photographing lens of claim 1, wherein the fifth lens is an aspheric lens.

22. An electronic apparatus comprising:
a photographing lens; and
an image sensor that receives an optical image formed by the photographing lens and converts the optical image into an electrical image signal,
wherein the photographing lens comprises:
a first lens that comprises a convex object-side surface and has a positive refractive power;
a second lens that comprises a convex image-side surface and has a positive or negative refractive power;
a third lens that has a negative refractive power;
a fourth lens that has a positive or negative refractive power;
a fifth lens that comprises a convex image-side surface and has a positive refractive power; and
a sixth lens that comprises an image-side surface that is concave near an optical axis, and has a negative refractive power,
wherein the first through sixth lenses are sequentially arranged from an object side.

23. The electronic apparatus of claim 22, wherein the photographing lens satisfies $$20 < V1 - V3 < 45$$

where V1 is an Abbe number of the first lens, and V3 is an Abbe number of the third lens.

* * * * *